US006614444B1

(12) United States Patent
Duluk, Jr. et al.

(10) Patent No.: US 6,614,444 B1
(45) Date of Patent: Sep. 2, 2003

(54) APPARATUS AND METHOD FOR FRAGMENT OPERATIONS IN A 3D-GRAPHICS PIPELINE

(75) Inventors: Jerome F. Duluk, Jr., Palo Alto, CA (US); Sushma S. Trivedi, Sunnyvale, CA (US); Sam Ng, Fremont, CA (US); Lindy Fung, Sunnyvale, CA (US); Richard E. Hessel, Pleasanton, CA (US); Jack Benkual, Cupertino, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/372,137

(22) Filed: Aug. 20, 1999

Related U.S. Application Data

(63) Continuation of application No. 09/213,990, filed on Dec. 17, 1998.
(60) Provisional application No. 60/097,336, filed on Aug. 20, 1998.

(51) Int. Cl.[7] ................................................ G09G 5/00
(52) U.S. Cl. ........................ 345/581; 345/422; 345/592; 345/537; 345/545
(58) Field of Search ................................. 345/501, 502, 345/506, 522, 509, 553, 419, 421, 422, 426, 427, 581, 582, 589, 596, 611, 612, 613, 614, 619, 620, 625, 628, 545, 546, 552, 691, 694, 428, 537

(56) References Cited

U.S. PATENT DOCUMENTS

| | | | |
|---|---|---|---|
| 4,783,829 A | 11/1988 | Miyakawa et al. | |
| 4,945,500 A | 7/1990 | Deering | 364/522 |
| 4,970,636 A | 11/1990 | Snodgrass et al. | 364/518 |
| 5,083,287 A | 1/1992 | Obata et al. | 395/126 |
| 5,123,085 A | 6/1992 | Wells et al. | |
| 5,402,532 A | 3/1995 | Epstein et al. | 395/122 |

(List continued on next page.)

OTHER PUBLICATIONS

Watt, "3D Computer Graphics" (2nd ed.), Chapter 4, Reflection and Illumination Models, p. 89–126.

(List continued on next page.)

*Primary Examiner*—Mano Padmanabhan
(74) *Attorney, Agent, or Firm*—Dorsey & Whitney LLP; R. Michael Ananian

(57) ABSTRACT

Apparatus and methods for rendering 3D graphics images. The apparatus include a port for receiving commands from a graphics application, an output for sending a rendered image to a display and a fragment-operations pipeline, coupled to the port and to the output, the pipeline including a stage for performing a fragment operation on a fragment on a per-pixel basis, as well as a stage for performing a fragment operation on the fragment on a per-sample basis. The stage for performing on a per-pixel basis is one of the following: a scissor-test stage, a stipple-test stage, an alpha-test stage or a colorest stage, and the stage for performing on a per-sample basis is one of the following: a Z-test stage, a blending stage or a dithering stage. The apparatus programmatically selects whether to perform a stencil test on a per-pixel or a per-sample basis and performs the stencil test on the selected basis. The apparatus also programmatically selects pixel samples for per-sample operations, where the sample selections differ with different instances of the same per-sample operation. The apparatus also programmatically selects a set of subdivisions of a pixel as samples for use in the per-sample fragment operation, programmatically assigns different weights to at least two samples in the set and performs the per-sample fragments operation on the fragment using the programmatically selected and differently weighted samples.

32 Claims, 12 Drawing Sheets

U.S. PATENT DOCUMENTS

| | | |
|---|---|---|
| 5,448,690 A | 9/1995 | Shiraishi et al. |
| 5,455,900 A | 10/1995 | Shiraishi et al. |
| 5,481,669 A | 1/1996 | Poulton et al. |
| 5,574,836 A | 11/1996 | Broemmelsiek ............ 395/127 |
| 5,579,455 A | 11/1996 | Greene et al. |
| 5,596,686 A | 1/1997 | Duluk, Jr. |
| 5,664,071 A | 9/1997 | Nagashima |
| 5,684,939 A | 11/1997 | Foran et al. ................. 395/131 |
| 5,699,497 A | 12/1997 | Erdahl et al. |
| 5,710,876 A | 1/1998 | Peercy et al. ............... 395/126 |
| 5,767,589 A | 6/1998 | Lake et al. |
| 5,767,859 A | 6/1998 | Rossin et al. ............... 345/434 |
| 5,798,770 A * | 8/1998 | Baldwin ..................... 345/506 |
| 5,828,378 A | 10/1998 | Shiraishi ..................... 345/422 |
| 5,850,225 A | 12/1998 | Cosman |
| 5,854,631 A | 12/1998 | Akeley et al. .............. 345/419 |
| 5,860,158 A | 1/1999 | Pai et al. |
| 5,864,342 A | 1/1999 | Kajiya et al. ............... 345/418 |
| RE36,145 E | 3/1999 | DeAguiar et al. .......... 345/511 |
| 5,880,736 A | 3/1999 | Peercy et al. ............... 345/426 |
| 5,889,997 A | 3/1999 | Strunk |
| 5,920,326 A | 7/1999 | Rentschler et al. ......... 345/503 |
| 5,949,424 A | 9/1999 | Cabral et al. ............... 345/426 |
| 5,949,428 A | 9/1999 | Toelle et al. |
| 5,977,977 A | 11/1999 | Kajiya et al. ............... 345/418 |
| 5,990,904 A | 11/1999 | Griffin |
| 6,002,410 A | 12/1999 | Battle |
| 6,002,412 A | 12/1999 | Schinnerer |
| 6,118,452 A | 9/2000 | Gannett |
| 6,128,000 A * | 10/2000 | Jouppi et al. ............... 345/136 |
| 6,167,486 A | 12/2000 | Lee et al. |
| 6,204,859 B1 | 3/2001 | Jouppi et al. |
| 6,229,553 B1 | 5/2001 | Duluk, Jr. et al. |
| 6,259,452 B1 | 7/2001 | Coorg et al. |

OTHER PUBLICATIONS

Foley et al., Computer Graphics—Principles and Practice (2nd ed. 1996), Chapter 16, Illumination and Shading, pp. 721–814.

Lathrop, "The Way Computer Graphics Works" (1997) Chapter 7, Rendering (Converting A Scene to Pixels), pp. 93–150.

Peercy et al., "Efficient Bump Mapping Hardware" (Computer Graphics Proceedings, Annual Conference Series, 1997) pp. 303–306.

Schilling et al., "Texram: a smart memory for texturing," IEEE computer graphics and applications, 5/96, 32–41.

Angel (interactive computer graphics: a top–down approach with OpenGl: ISBN: 0–201–85571–2—sections 6.8 & 7.7.2).

* cited by examiner

APPARATUS AND METHOD FOR FRAGMENT OPERATIONS IN A 3D-GRAPHICS PIPELINE

CROSS-REFERENCE TO RELATED APPLICATIONS

This application claims the benefit under 35 USC Section 119(e) of U.S. Provisional Patent Application Serial No. 60/097,336, filed Aug. 20, 1998 and entitled, "GRAPHICS PROCESSOR WITH DEFERRED SHADING and A CONTINUATION" of U.S. Patent Application Serial No. 09/213, 990, filed Dec. 17, 1998 entitled, "HOW TO DO TANGENT SPACE LIGHTING IN A DEFERRED SHADING ARCHITECTURE," each of which is hereby incorporated by reference.

This application is also related to the following U.S. Patent Applications, each of which is incorporated herein by reference:

Ser. No. 09/213,990, filed Dec.17, 1998, entitled, "HOW TO DO TANGENT SPACE LIGHTING IN A DEFERRED SHADING ARCHITECTURE" (Atty. Doc. No. A-66397);

Ser. No. 09/378,598, filed Aug. 20, 1999, entitled, "APPARATUS AND METHOD FOR PERFORMING SETUP OPERATIONS IN A 3-D GRAPHICS PIPELINE USING UNIFIED PRIMITIVE DESCRIPTORS" (Atty. Doc. No. A-66382);

Ser. No. 09/378,633, filed Aug. 20, 1999, entitled, "SYSTEM, APARATUS AND METHOD FOR SPATIALLY SORTING IMAGE DATA IN A THREE-DIMENSIONAL GRAPHICS PIPELINE" (Atty. Doc. No. A-66380);

Ser. No. 09/378,439, filed Aug. 20, 1999, entitled, "GRAPHICS PROCESSOR WITH PIPELINE STATE STORAGE AND RETRIEVAL" (Atty. Doc. No. A-66378);

Ser. No. 09/378,408, filed Aug. 20, 1999, entitled, "METHOD AND APPARATUS FOR GENERATING TEXTURE" (Atty. Doc. No. A-66398);

Ser. No. 09/379,144, filed Aug. 20, 1999, entitled, "APPARATUS AND METHOD FOR GEOMETRY OPERATIONS IN A 3D GRAPHICS PIPELINE" (Atty. Doc. No. A-66373);

Ser. No. 09/378,637, filed Aug. 20, 1999, entitled, "DEFERRED SHADING GRAPHICS PIPELINE PROCESSOR" (Atty. Doc. No. A-66360);

Ser. No. 09/377,503, filed Aug. 20, 1999, entitled "DEFERRED SHADING GRAPHICS PIPELINE PROCESSOR HAVING ADVANCED FEATURES";

Ser. No. 09/378,391, filed Aug. 20, 1999, entitled "METHOD AND APPARATUS FOR PERFORMING CONSERVATIVE HIDDEN SURFACE REMOVAL IN A GRAPHICS PROCESSOR WITH DEFERRED SHADING";

Ser. No. 09/378,299, filed Aug. 20, 1999, entited "DEFERRED SHADING GRAPHICS PIPELINE PROCESSOR", now U.S. Pat. No. 6,229,553; and Ser. No. .09/378,598, filed Aug. 20, 1999, entitled "APPARATUS AND METHOD FOR PERFORMING SETUP OPERATIONS IN A 3-D GRAPHICS PIPELINE USING UNIFIED PRIMITIVE DESCRIPTORS".

FIELD OF THE INVENTION

This invention relates to high-performance 3-D graphics imaging. More particularly, the invention relates to per-fragment operations in a 3D-graphics pipeline.

BACKGROUND

Three-Dimensional Computer Graphics

Computer graphics is the art and science of generating pictures with a computer. Generation of pictures, or images, is commonly called rendering. Generally, in three-dimensional (3D) computer graphics, geometry that represents surfaces (or volumes) of objects in a scene is translated into pixels stored in a framebuffer and then displayed on a display device.

In a 3D animation, a sequence of still images is displayed, giving the illusion of motion in three-dimensional space. Interactive 3D computer graphics allows a user to change his viewpoint or change the geometry in real-time, thereby requiring the rendering system to create new images on the fly in real time.

In 3D computer graphics, each renderable object generally has its own local object coordinate system and, therefore, needs to be translated (or transformed) from object coordinates to pixel-display coordinates. Conceptually, this translation is a four-step process: 1) translation from object coordinates to world coordinates, the coordinate system for the entire scene, 2) translation from world coordinates to eye coordinates, based on the viewing point of the scene, 3) translation from eye coordinates to perspective-translated eye coordinates and 4) translation from perspective-translated eye coordinates to pixel (screen) coordinates. These translation steps can be compressed into one or two steps by pre-computing appropriate translation matrices before any translation occurs.

(Translation from object coordinates includes scaling for size enlargement or shrink. Perspective scaling makes farther objects appear smaller. Pixel coordinates are points in three-dimensional space in either screen precision (that is to say, pixels) or object precision (that is to say, high-precision numbers, usually floating-point).

Once the geometry is in screen coordinates, it is broken into a set of pixel-color values (that is, "rasterized") that are stored into the framebuffer.

A summary of the prior-art rendering process can be found in Watt, *Fundamentals of Three-dimensional Computer Graphics* (Addison-Wesley Publishing Company, 1989, reprinted 1991, ISBN 0-201-15442-0, herein "Watt" and incorporated by reference), particularly Chapter 5, "The Rendering Process," pages 97 to 113, and Foley et al., *Computer Graphics: Principles and Practice,* 2nd edition (Addison-Wesley Publishing Company, 1990, reprinted with corrections 1991, ISBN 0-201-12110-7, herein "Foley et al." and incorporated by reference).

FIG. 1 shows a three-dimensional object, a tetrahedron, with its own coordinate axes ($x_{object}$, $y_{object}$, $z_{object}$). The three-dimensional object is translated, scaled and placed in the viewing point's coordinate system based on ($x_{eye}$, $y_{eye}$, $z_{eye}$) The object is projected onto the viewing plane, thereby correcting for perspective. At this point, the object appears to have become two-dimensional. The object's z-coordinates, however, are preserved for later use in hidden-surface removal. The object is finally translated to screen coordinates, based on ($x_{screen}$, $y_{screen}$, $z_{screen}$), where $z_{screen}$ is going perpendicularly into the page. Points on the object now have their x and y coordinates described by pixel location (and fractions thereof) within the display screen and their z coordinates in a scaled version of distance from the viewing point.

Generic 3D-Graphics Pipeline

Many hardware renderers have been developed. See, for example, Deering et al., "Leo: A System for Cost Effective 3D Shaded Graphics," SIGGRAPH93 Proceedings, Aug.

1–6, 1993, Computer Graphics Proceedings, Annual Conference Series (ACM SIGGRAPH, 1993, Soft-cover ISBN 0-201-58889-7 and CD-ROM ISBN 0-201-56997-3, herein "Deering et al." and incorporated by reference), particularly at pages 101 to 108. Deering et al. includes a diagram of a generic 3D-graphics pipeline (that is to say, a renderer, or a rendering system) that it describes as "truly generic, as at the top level nearly every commercial 3D graphics accelerator fits this abstraction." This pipeline diagram is reproduced here as FIG. 6. (In this figure, the blocks with rounded corners typically represent functions or process operations, while sharp-cornered rectangles typically represent stored data or memory.)

Such pipeline diagrams convey the process of rendering but do not describe any particular hardware. This document presents a new graphics pipeline that shares some of the steps of the generic 3D-graphics pipeline. Each of the steps in the generic 3D-graphics pipeline is briefly explained here. (Processing of polygons is assumed throughout this document, but other methods for describing 3D geometry could be substituted. For simplicity of explanation, triangles are used as the type of polygon in the described methods.)

As seen in FIG. 6, the first step within the floating point-intensive functions of the generic 3D-graphics pipeline after the data input (step 612) is the transformation step (step 614), described above. The transformation step also includes "get next polygon."

The second step, the clip test, checks the polygon to see if it is at least partially contained in the view volume (sometimes shaped as a frustum) (step 616). If the polygon is not in the view volume, it is discarded. Otherwise, processing continues.

The third step is face determination, where polygons facing away from the viewing point are discarded (step 618).

The fourth step, lighting computation, generally includes the set up for Gouraud shading and/or texture mapping with multiple light sources of various types but could also be set up for Phong shading or one of many other choices (step 622).

The fifth step, clipping, deletes any portion of the polygon that is outside of the view volume because that portion would not project within the rectangular area of the viewing plane (step 624). Generally, polygon clipping is done by splitting the polygon into two or more smaller polygons that both project within the area of the viewing plane. Polygon clipping is computationally expensive.

The sixth step, perspective divide, does perspective correction for the projection of objects onto the viewing plane (step 626). At this point, the points representing vertices of polygons are converted to pixel-space coordinates by step seven, the screen space conversion step (step 628).

The eighth step (step 632), set up for an incremental render, computes the various begin, end and increment values needed for edge walking and span interpolation (e.g.: x, y and z coordinates, RGB color, texture map space, u and v coordinates and the like).

Within the drawing-intensive functions, edge walking (step 634) incrementally generates horizontal spans for each raster line of the display device by incrementing values from the previously generated span (in the same polygon), thereby "walking" vertically along opposite edges of the polygon. Similarly, span interpolation (step 636) "walks" horizontally along a span to generate pixel values, including a z-coordinate value indicating the pixel's distance from the viewing point. Finally, the z-buffered blending (also referred to as Testing and Blending) (step 638) generates a final pixel-color value. The pixel values include color values, which can be generated by simple Gouraud shading (that is to say, interpolation of vertex-color values) or by more computationally expensive techniques such as texture mapping (possibly using multiple texture maps blended together), Phong shading (that is to say, per-fragment lighting) and/or bump mapping (perturbing the interpolated surface normal).

After drawing-intensive functions are completed, a double-buffered MUX output look-up table operation is performed (step 644). The generic 3D-graphics pipeline includes a double-buffered framebuffer, so a double-buffered MUX is also included. An output lookup table is included for translating color-map values.

By comparing the generated z-coordinate value to the corresponding value stored in the Z Buffer, the z-buffered blend either keeps the new pixel values (if it is closer to the viewing point than previously stored value for that pixel location) by writing it into the framebuffer or discards the new pixel values (if it is farther).

At this step, antialiasing methods can blend the new pixel color with the old pixel color. The z-buffered blend generally includes most of the per-fragment operations, described below.

Finally, digital to analog conversion makes an analog signal for input to the display device.

Per-Fragment Operations

In the generic 3D-graphics pipeline, the z-buffered-blend step actually incorporates many smaller per-fragment operational steps.

Application Program Interfaces (APIs) define a set of per-fragment operations. Open Graphics Library (OpenGL), D3D, Performer, Inventor and B-Render are examples. A review of some exemplary OpenGL per-fragment operations follows so that generic similarities and true differences between the inventive structures and methods and conventional structures and procedures can be more readily appreciated. The language of the OpenGL API is adopted, except as contraindicated herein. (See, for example, Open Architecture Review Board, *OpenGL Reference Manual*, 2nd edition (Addison-Wesley Developers Press, 1996) and OpenGL Architecture Review Board, *OpenGL Programming Guide*, 2nd edition (Addison-Wesley, 1997), both incorporated herein by reference.

A framebuffer stores a set of pixels as a two-dimensional array. Each pixel stored in the framebuffer is a set of bits. The number of bits per pixel may vary depending on the particular implementation or context. An implementation may allow a choice in the selection of the number of bits per pixel, but within a context all pixels have the same number of bits.

Corresponding bits from each pixel in the framebuffer form a bitplane. Each bitplane contains a single bit from each pixel. The bits at location (x, y) of all the bitplanes in the framebuffer constitute the single pixel (x, y). Groups of bitplanes form several logical buffers, namely, the color, depth, stencil and accumulation buffers.

The color buffer, in turn, includes a front left, front right, back left, back right and some additional auxiliary buffers. The values stored in the front buffers are the values typically displayed on a display monitor while the contents of the back buffers and auxiliary buffers are invisible and not displayed. Stereoscopic contexts display both the front left and the front right buffers, while monoscopic contexts display only the front left buffer. In general, the color buffers must have the same number of bitplanes, but particular implementations or context may not provide right buffers, back buffers or auxiliary buffers at all, and an implementation or context may additionally provide or not provide stencil, depth or accumulation buffers.

The color buffers generally consist of unsigned-integer color indices (R, G, B) and, optionally, a number "A" of unsigned-integer value. The values, however, could be floating-point numbers or signed-integer values. The number of bitplanes in each of the color buffers, the depth buffer (if provided), the stencil buffer (if provided) and the accumulation buffer (if provided) is fixed on a per-context basis. If an accumulation buffer is provided, it has at least as many bitplanes per R, G and B color component as do the color buffers.

A rasterization-produced fragment with window coordinates of ($x_{WINDOW}$, $y_{WINNDOW}$) modifies the pixel in the framebuffer at those coordinates based on a number of tests, parameters and conditions. Among the several tests typically performed sequentially, beginning with a fragment and its associated data and finishing with a final output stream to the framebuffer, are (in the order performed, with some variation among APIs): pixel-ownership test, scissor test, alpha test, color test, stencil test, depth test, blending, dithering and logic operations. Each of these tests or operations is briefly described below. (OpenGL does not provide for an explicit color test between the alpha and stencil tests. OpenGL per-fragment operations are applied after all the color computations.)

Ownership Test

The pixel-ownership test determines if the pixel at location ($x_{WINDOW}$, $y_{WINDOW}$) in the framebuffer is currently owned by the graphics-language context. If it is not, the window system decides the fate of the incoming fragment. Possible results are that the fragment is discarded or that some subset of the subsequent per-fragment operations are applied to the fragment. Pixel ownership allows the window system to properly control the GL's behavior.

Assume that in a computer having a display screen, one or several processes are running and that each process has a window on the display screen. For each process, the associated window defines the pixels to which the process wants to write or render. When there are two or more windows, the window associated with one process may be in front of the other window associated with another process, behind that other window or along with the other window entirely visible. Since there is only a single framebuffer for the entire display screen, the pixel-ownership test determines which process and associated window owns each of the pixels. If a particular process does not "own" a pixel, it fails the pixel-ownership test relative to the framebuffer, and that pixel is thrown away.

Under the typical paradigm, the pixel-ownership test is run by each process. For a given pixel location in the framebuffer, that pixel passes the pixel-ownership test for at most one of the processes and fails the pixel-ownership test for all other processes. Only one process owns a particular framebuffer pixel at the same time.

In some rendering schemes, the pixel-ownership test may not be particularly relevant. For example, if the scene is being rendered to an off-screen buffer and subsequently block transferred ("blitted") to the desktop, pixel ownership is not particularly relevant. Each pixel that a process tests automatically or necessarily passes the pixel-ownership test (if it is even executed) because each process effectively owns its own off-screen buffer and nothing is in front of that buffer.

If for a particular process, the pixel is not owned by that process, writing a pixel value to that location is unnecessary. All subsequent processing for that pixel may be ignored. In a typical workstation, all the data associated with a particular pixel on the screen is read during rasterization. All information for any polygon that feeds that pixel is read, including information as to the identity of the process that owns that framebuffer pixel, as well as the z-buffer, the color value, the old color value, the alpha value, stencil bits and so forth.

If a process owns the pixel, then the other downstream processes are executed (for example, scissor test, alpha test and the like).

Scissor Test

The scissor test determines if ($x_{WINDOW}$, $y_{WINDOW}$) lies within a scissor rectangle defined by four coordinate values corresponding to a left bottom (left, bottom) coordinate, a width of the rectangle and a height of the rectangle. (See, for example, the OpenGL procedure Scissor(left, bottom, width, height). If left$\leq x_{WINDOW}$<left+width and bottom$\leq y_{WINDOW}$<bottom+height, then the scissor test passes. Otherwise, the scissor test fails, and the particular fragment being tested is discarded.

In simple terms, a scissor rectangle defines a screen-aligned region. This scissor rectangle is useful in that only pixels from a polygon that fall in that screen-aligned scissor rectangle change. In the event that a polygon straddles the scissor rectangle, only those pixels that are inside the rectangle may change. An implementation may allow more than one scissor rectangle. A scissor rectangle list can be used for rendering to a window that is partially obscured such that the visible portion of the window consists of more than one rectangular region.

Just as with the pixel-ownership test, the scissor test provides means for discarding pixels and/or fragments before they actually get to the framebuffer to cause the output to change.

When a polygon comes down the pipeline, the pipeline calculates everything it needs to determine the z-value and color of that pixel. Once z value and color are determined, that information helps to determine what information is placed in the framebuffer, thereby determining what is on the display screen.

Stipple Test

The stipple test uses a 32x32-bit window-aligned stipple pattern. The stipple pattern is a mask of 0s and 1s. The stipple pattern is tiled on the window. The stipple test passes if the bit in the stipple pattern at ($x_{WINDOW}$, $y_{WINDOW}$) is set, i.e. is 1. Otherwise, the stipple test fails, and the particular fragment being tested is discarded.

Alpha Test

Color is defined by four values, red (R), green (G), blue (B) and alpha (A). The RGB values define the contribution from each of the primary colors, and alpha is related to the transparency. Typically, color is a 32-bit value, 8-bits for each component, though such representation is not limited to 32-bits. The alpha test compares the alpha value of a given pixel to an alpha-reference value. Any pixel not passing the alpha test is thrown away or otherwise discarded.

The type of comparison may also be specified. For example, the comparison may be a greater-than operation, a less-than operation and so forth. If the comparison is a greater-than operation, then the pixel's alpha value has to be greater than the reference to pass the alpha test. So if the pixel's alpha value is 0.9, the reference alpha is 0.8 and the comparison is greater-than, then that pixel passes the alpha test.

The alpha test is a per-fragment operation and happens after all of the fragment coloring calculations and lighting and shading operations are completed. Each of these per-fragment operations may be thought of as part of the conventional z-buffer blending operations.

Color Test

The color test is similar to the alpha test described hereinbefore, except that rather than performing the magnitude or logical comparisons between the pixel alpha (A) value and a reference value, the color test performs a magnitude or logical comparison between one or a combination of the R, G or B color components and reference value(s). Although for the alpha test, one typically has one value for each component, for the color test there are effectively two values per component, a maximum value and a minimum value.

The comparison test may be, for example, greater-than, less-than, equal-to, greater-than-or-equal-to, "greater-than-$c_1$ and less- than $c_2$," where $c_1$ and $c_2$ are predetermined reference values, and so forth. One might, for example, specify a reference minimum R value and a reference maximum R value, such that the color test passes only if the pixel R value is between that minimum and maximum. The color test might be useful to provide blue-screen functionality, for example.

Stencil Test

The stencil test conditionally discards a fragment based on the outcome of a comparison between a value stored in a stencil buffer at location ($x_{WINDOW}$, $y_{WINDOW}$) and a reference value. If the stencil test fails, the incoming fragment is discarded, although the corresponding stencil buffer value may be modified in accordance with the specified stencil operation to be carried out on failing the stencil test.

When an object is rendered into the framebuffer, a tag having the stencil bits is also written into the framebuffer. These stencil bits are part of the pipeline state. The type of the stencil test to perform can be specified at the time the geometry is rendered.

The stencil bits are used to implement various filtering, masking or stenciling operations. For example, if a particular fragment ends up affecting a particular pixel in the framebuffer, then the stencil bits can be written to the framebuffer along with the pixel information.

Several stencil comparison functions are permitted such that the stencil test passes never, always or if the reference value is less than, less than or equal to, equal to, greater than or equal to, greater than, or not equal to the masked stored value in the stencil buffer.

The reference value and the comparison value can have multiple bits, typically 8 bits so that 256 different values may be represented.

Depth-Buffer Test

The depth-buffer test discards the incoming fragment if a depth comparison fails. The comparison is programmatically enabled or disabled. When the depth test is disabled, the depth comparison and subsequent possible updates to the depth-buffer value are bypassed, and a fragment is passed to the next operation. The stencil bits are also involved and may be modified even if the test is bypassed. In this case, the stencil value is modified as if the depth-buffer test passed.

If the depth test is enabled, the depth comparison takes place and the depth buffer and stencil value may subsequently be modified.

Depth comparisons are implemented in which possible outcomes are as follows: the depth-buffer test passes never, always or if the incoming fragment's $z_{WINDOW}$ value is less than, less than or equal to, equal to, greater than, greater than or equal to, or not equal to the depth value stored at the location given by the incoming fragment's ($x_{WINDOW}$, $y_{WINDOW}$) coordinates. If the depth-buffer test fails, the incoming fragment is discarded. The stencil value at the fragment's ($x_{WINDOOW}$, $y_{WINDOW}$) coordinate is updated according to the function currently in effect for depth-buffer test failure. Otherwise, the fragment continues to the next operation and the value of the depth buffer at the fragment's ($x_{WINDOW}$, $y_{WINDOW}$) location is set to the fragment's $z_{WINDOW}$ value. In this case the stencil value is updated according to the function currently in effect for depth-buffer test success.

Blending

Blending combines the incoming fragment's R, G, B and A values with the R, G, B and A values stored in the framebuffer at the incoming fragment's ($x_{WINDOW}$, $y_{WINDOW}$) location. This blending is typically dependent on the incoming fragment's alpha value (A) and that of the corresponding framebuffer stored pixel. (In the following discussion, "Cs" refers to the source color for an incoming fragment, "Cd" refers to the destination color at the corresponding framebuffer location, and "Cc" refers to a constant color in-the GL state. Subscripts of 's,' 'd' and 'c' respectively denote individual RGBA components of these colors.)

Generally speaking, blending is an operation that takes color in the framebuffer and the color in the fragment and blends them together. The manner in which blending is achieved, that is, the particular blending function, may be selected from various alternatives for both the source and destination.

For example, an additive-type blend is available wherein a blend result (C) is obtained by adding the product of a source color (Cs) by a source weighting-factor quadruplet (S) to the product of a destination color (Cd) and a destination weighting-factor quadruplet (D), that is, $C=C_sS+C_dD$. Alternatively, the blend equation may be a subtraction ($C=C_sS-C_dD$), a reverse subtraction, ($C=C_dD-C_sS$), a minimum function, ($C=\min(C_s, C_d)$), or a maximum function, ($C=\max(C_s, C_d)$). The blending equation is evaluated separately for each color component and its corresponding weighting coefficient. Each of the four R, G, B, A components has its own weighting factor.

The blending test (or blending equation) is part of the pipeline state and can potentially change for every polygon but, more typically, changes only for an object made up of several polygons.

In general, blending is performed only after other tests such as the pixel-ownership test and stencil test have passed. Then it is clear that the pixel or fragment under consideration would or could have an effect in the output.

Dithering

Dithering selects between two color values or indices. In RGBA mode, the value of any of the color components is essentially a fixed-point value, c, with m bits to the left of the binary point, where m is the number of bits allocated to that component in the framebuffer. For each c, dithering selects a value c' such that $c' \in \{\max\{0, \text{Ceiling}(c)-1\}, \text{Ceiling}(c)\}$. In color index mode, the same rule applies with c being a single-color index. This selection may depend on the $x_{WINDOW}$ and $y_{WINDOW}$ coordinates of the pixel. (The value of c cannot be larger than the maximum value representable in the framebuffer for the color component.)

Although many dithering algorithms are possible, a dithered value produced by any algorithm generally depends on only the incoming value and the fragment's x and y window coordinates. When dithering is disabled, each color component is truncated to a fixed-point value with as many bits as there are in the corresponding framebuffer component.

Logical Operations

A final logical operation applies between the incoming fragment's color or index values and the color or index values stored in the framebuffer at the corresponding location. The result of the logical operation replaces the values in the framebuffer at the fragment's (x, y) coordinates. Various logical operations may be implemented between source (s) and destination (d), including for example: CLEAR, SET, AND, NOOP, XOR, OR, NOR, NAND, INVERT, COPY, INVERTED AND, EQUIVALENCE, REVERSE OR, REVERSE AND, INVERTED COPY and INVERTED OR. Logical operations are performed independently for each color-index buffer that is selected for writing or for each red, green, blue and alpha value of each color buffer that is selected for writing.

Antialiasing

Pixels are the smallest individually controllable element of the display device. However, with images quantized into discrete pixels, spatial aliasing occurs. A typical aliasing artifact is a "staircase" effect caused when a straight line or edge cuts diagonally across rows of pixels.

Some rendering systems reduce aliasing effects by dividing pixels into sub-pixels, where each sub-pixel can be colored independently. When the image is to be displayed, the colors for all sub-pixels within each pixel are blended together to form an average color for the pixel. A renderer that uses up to 16 sub-pixels per pixel is described in Akeley, "RealityEngine Graphics," SIGGRAPH93 Proceedings, Aug. 1–6, 1993, Computer Graphics Proceedings, Annual Conference Series, pages 109 to 116 (ACM SIGGRAPH, New York, 1993, Softcover ISBN 0-201-58889-7 and CD-ROM ISBN 0-201-56997-3, herein "Akeley" and incorporated by reference).

Carpenter, "The A-buffer, an Antialiased Hidden Surface Method," SIGGRAPH 1984 Conference Proceedings, pp.103–108 (July 1984, herein "Carpenter" and incorporated by reference), describes another prior-art antialiasing method, the A-Buffer method. (Akeley also describes this technique.) The A-buffer is an antialiasing technique that reduces aliasing by keeping track of the percent coverage of a pixel by a rendered polgon.

The sub-pixel antialiasing approach is not without its problems. Assuming each pixel is divided into an n*m number of sub-pixels, some, if not all, of computations in the fragment-operations pipeline increase in number by a factor of n*m.

A counter approach to the n*m sub-pixels is the use of samples. Given n*m sub-pixels per pixel, prior-art fragment-operations pipelines select a fixed number H of these n*m sub-pixels from H fixed locations to represent the entire pixel. The fragment operations are applied to the H samples. At the end of the pipeline, each of the H samples is given the same weight in re-creating the pixel.

Additionally, all of the per-fragment operations of prior-art fragment-operations pipelines are done on a per-pixel basis where samples and sub-pixels have not been implemented. Where sub-pixels or samples or pixels are implemented, all of the pre-fragment operations are done on a respective per-sub-pixel or per-sample basis.

However, fixing the number, location and weight of samples restricts the flexibility of the fragment-operations pipeline and decreases the effectiveness of its techniques. Likewise, performing all fragment operations on a per-pixel, per-sub-pixel or per-sample basis restricts the flexibility of the fragment-operations pipeline and decreases its effectiveness.

The main drawback to the A-buffer technique is the need to sort polygons front-to-back (or back-to-front) at each pixel in order to get acceptable antialiased polygons.

Accordingly, there is a need for a multi-dimensionally flexible per-fragment pipeline. There is always a need for an antialiasing method that improves on the rendered image.

These and other goals of the invention will be readily apparent to one of skill in the art on reading the background above and the description below.

SUMMARY

Herein are described apparatus and methods for rendering 3D-graphics images with and without anti-aliasing. In one embodiment, the apparatus include a port for receiving commands from a graphics application, an output for sending a rendered image to a display and a fragment-operations pipeline, coupled to the port and to the output, the pipeline including a stage for performing a fragment operation on a fragment on a per-pixel basis, as well as a stage for performing a fragment operation on the fragment on a per-sample basis.

In one embodiment, the stage for performing on a per-pixel basis is one of the following: a scissor-test stage, a stipple-test stage, an alpha-test stage or a color-test stage. The stage for performing on a per-sample basis is one of the following: a Z-test stage, a blending stage or a dithering stage.

In another embodiment, the apparatus programmatically selects whether to perform a stencil test on a per-pixel or a per-sample basis and performs the stencil test on the selected basis.

In another embodiment, the apparatus programmatically selects a set of subdivisions of a pixel as samples for use in the per-sample fragment operation and performs the per-sample fragment operation, using the programmatically selected samples.

In another embodiment, the apparatus programmatically allows primitive based anti-aliasing, i.e. the anti-aliasing may be turned on or off on a per-primitive basis.

In another embodiment, the apparatus programmatically performs several passes through the geometry. The apparatus selects the first set of subdivisions of a pixel as samples for use in the per-sample fragment operation and performs the per-sample fragment operation, using the programmatically selected samples. It then programmatically selects a different set of the pixel subdivisions as samples for use in a second per-sample fragment operation and then performs the second per-sample fragment operation, using the programmatically selected samples.

The color values resulting from the second pass are accumulated with the color values from the first pass. Several passes can be performed to effectively increase the number of samples per pixel. The sample locations for each pass are different and the pixel color values are accumulated with the results of the previous passes.

The apparatus programmatically selects a set of subdivisions of a pixel as samples for use in the per-sample fragment operation, programmatically assigns weights to the samples in the set and performs the per-sample fragment operation on the fragment. The apparatus programmatically determines the method for combining the color values of the samples in a pixel to obtain the resulting color in the framebuffer at the pixel location. In addition, the apparatus programmatically selects the depth value assigned to a pixel in the depth buffer from the depth values of all the samples in the pixel.

The apparatus includes a method to clear the color, depth, and stencil buffers partially or fully, without a read-modify-write operation on the framebuffer.

The apparatus includes a method for considering per-pixel depth values assigned to the polygon as well as the depth values interpolated from those specified at the vertices of the polygon.

The apparatus includes a method for considering per-pixel stencil values assigned to the polygon in stencil test, as well as the specified stencil reference value of the polygon.

The apparatus includes a method for determining if any pixel in the scene is visible on the screen without updating the color buffer.

DESCRIPTION OF SPECIFIC EMBODIMENTS

TABLE OF CONTENTS

Figure 1:
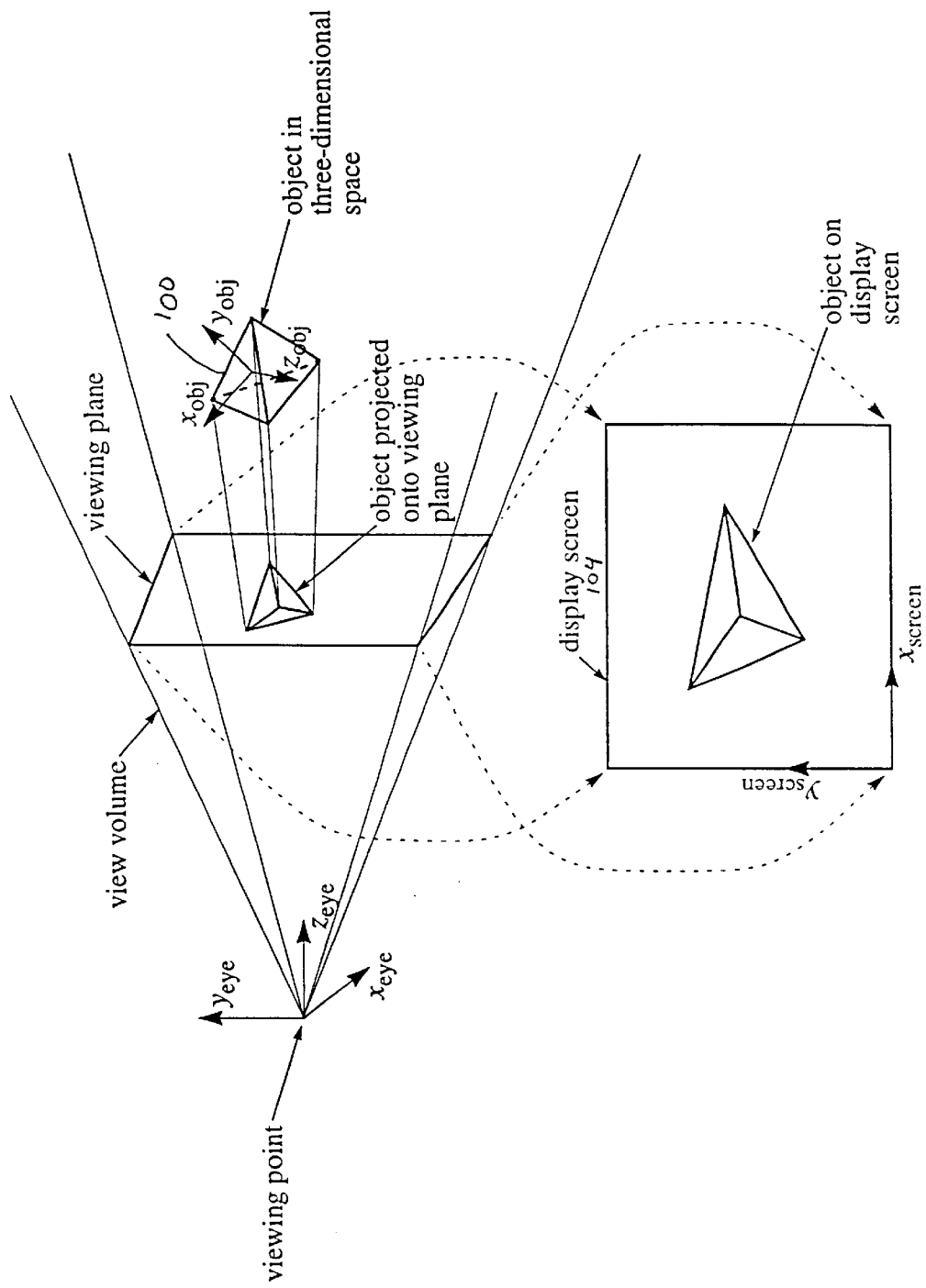
FIG. 1 shows a three-dimensional object, a tetrahedron, in various coordinate systems.

Abbreviations 19
Overview 20
  The Rendering System 20
  The Pixel Block 25
Data Structures 29
  Samples, Pixels, Stamps and Tiles 29
  The Begin_Frame and Prefetch_Begin_Frame Packets 30
  The End_Frame and Prefetch_EndFrame Packets 32
  The Begin_Tile and Prefetch_Begin_Tile Packets 33
  The Clear Packet 34
  The Pixel-Mode Cache_Fill Packet 35
  The Stipple Cache_Fill Packet 37
  The VSP Packet 37
  Color Packet 38
  Depth/Stencil Information 38
  State Parameters 39
Protocols 39
  Input Queuing and Filtering 43
  Input Processing 44
  Scissor Test 44
  Stipple Test 45
  Alpha Test 46
  Color Test 46
  Stencil/Z Test 47
  Depth Test 52
  Blending 54
  Dithering 55
  Logical Operations 57
  Tile Input and Output 57
WHAT IS CLAIMED IS 86

ABBREVIATIONS

Following are abbreviations which may appear in this description, along with their expanded meaning:

BKE: the back-end block 84C.
CUL: the cull unit 846.
MIJ: the mode-injection unit 847.
PHG: the Phong unit 84A.
PIX: the pixel block 84B.
PXO: the pixel-out unit 280.
SRT: the sort unit 844.
TEX: the texture unit 849.
VSP: a visible stamp portion.

OVERVIEW

The Rendering System

Figure 8:
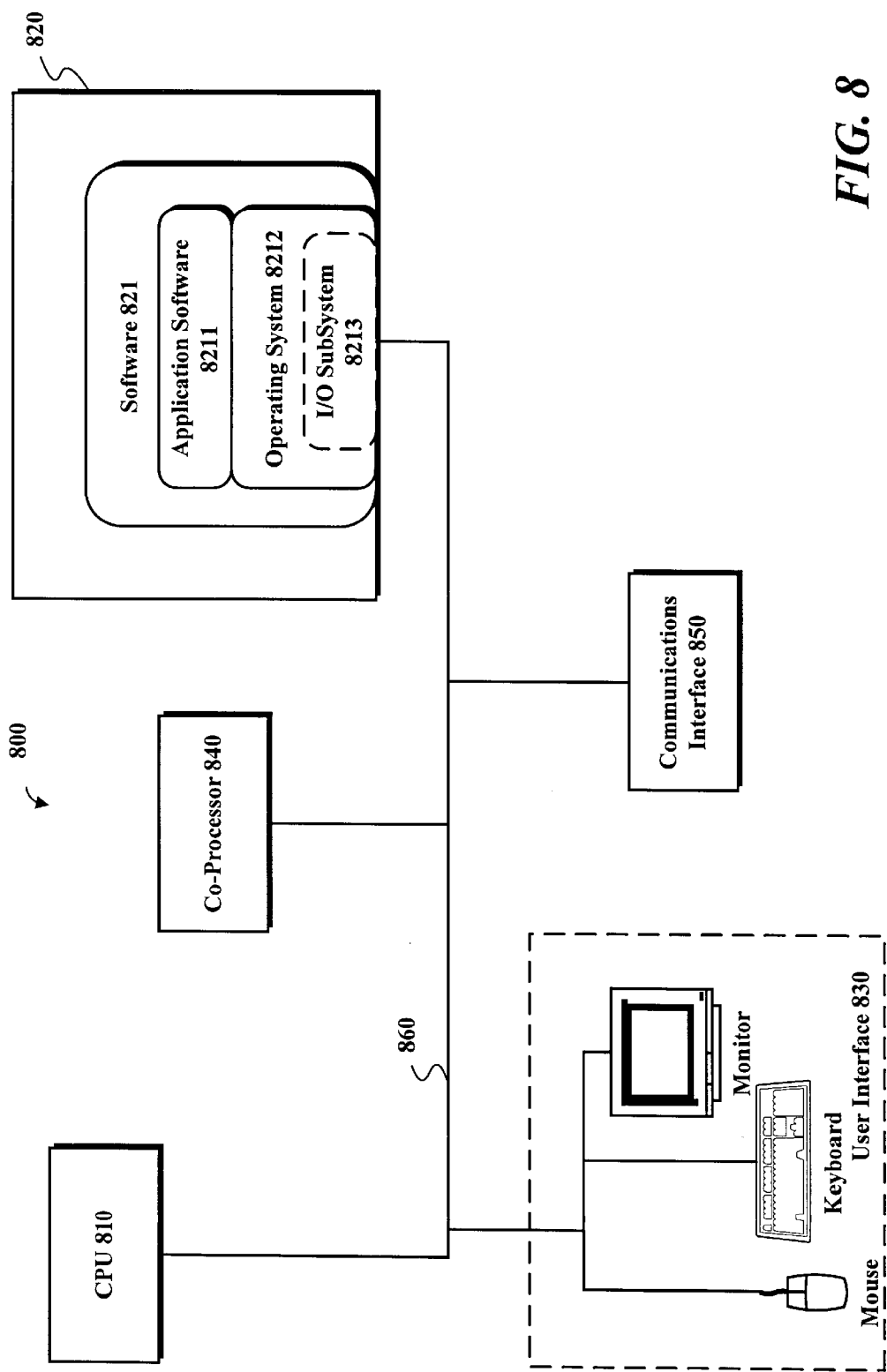
FIG. 8 illustrates a system for rendering three-dimensional graphics images.

FIG. 8 illustrates a system 800 for rendering three-dimensional graphics images. The rendering system 800 includes one or more of each of the following: data-processing units (CPUS) 810, memory 820, a user interface 830, a co-processor 840 such as a graphics processor, communication interface 850 and communications bus 860.

Of course, in an embedded system, some of these components may be missing, as is well understood in the art of embedded systems. In a distributed computing environment, some of these components may be on separate physical machines, as is well understood in the art of distributed computing.

The memory 820 typically includes high-speed, volatile random-access memory (RAM), as well as non-volatile memory such as read-only memory (ROM) and magnetic disk drives. Further, the memory 820 typically contains software 821. The software 821 is layered: Application software 8211 communicates with the operating system 8212, and the operating system 8212 communicates with the I/O subsystem 8213. The I/O subsystem 8213 communicates with the user interface 830, the co-processor 840 and the communications interface 850 by means of the communications bus 860.

The user interface 830 includes a display monitor 831.

The communications bus 860 communicatively interconnects the CPU 810, memory 820, user interface 830, graphics processor 840 and communication interface 850.

The memory 820 may include spatially addressable memory (SAM). A SAM allows spatially sorted data stored in the SAM to be retrieved by its spatial coordinates rather than by its address in memory. A single SAM query operation can identify all of the data within a specified spatial volume, performing a large number of arithmetic comparisons in a single clock cycle. For example, U.S. Pat. No. 4,996,666, entitled "Content-addressable memory system capable of full parallel magnitude comparison," (1991) further describes SAMs and is incorporated herein by reference.

The address space of the co-processor 840 may overlap, be adjacent to and/or disjoint from the address space of the memory 820, as is well understood in the art of memory mapping. If, for example, the CPU 810 writes to an accelerated graphics port at a predetermined address and the graphics co-processor 840 reads at that same predetermined address, then the CPU 810 can be said to be writing to a graphics port and the graphics processor 840 to be reading from such a graphics port.

Figure 3:
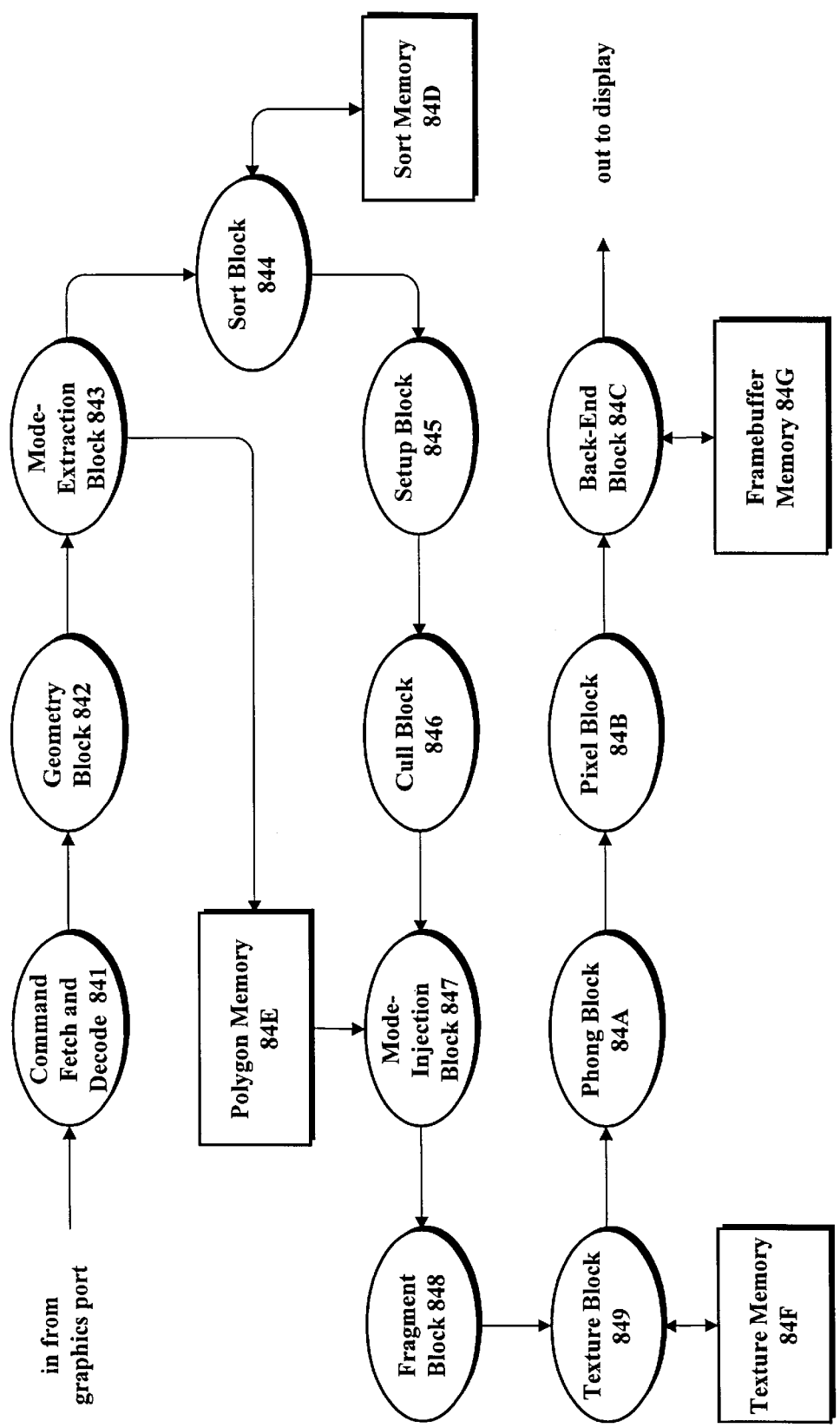
FIG. 3 is a high-level block diagram illustrating the components and data flow in a 3D-graphics pipeline incorporating the invention.

The graphics processor 840 is implemented as a graphics pipeline, this pipeline itself possibly containing one or more pipelines. FIG. 3 is a high-level block diagram illustrating the components and data flow in a 3D-graphics pipeline 840 incorporating the invention. The 3D-graphics pipeline 840 includes a command-fetch-and-decode block 841, a geometry block 842, a mode-extraction block 843, a sort block 844, a setup block 845, a cull block 846, a mode-injection block 847, a fragment block 848, a texture block 849, a Phong block 84A, a pixel block 84B, a back-end block 84C and sort, polygon, texture and framebuffer memories 84D, 84E, 84F, 84G. The memories 84D, 84E, 84F, 84G may be a part of the memory 820.

Figure 7:
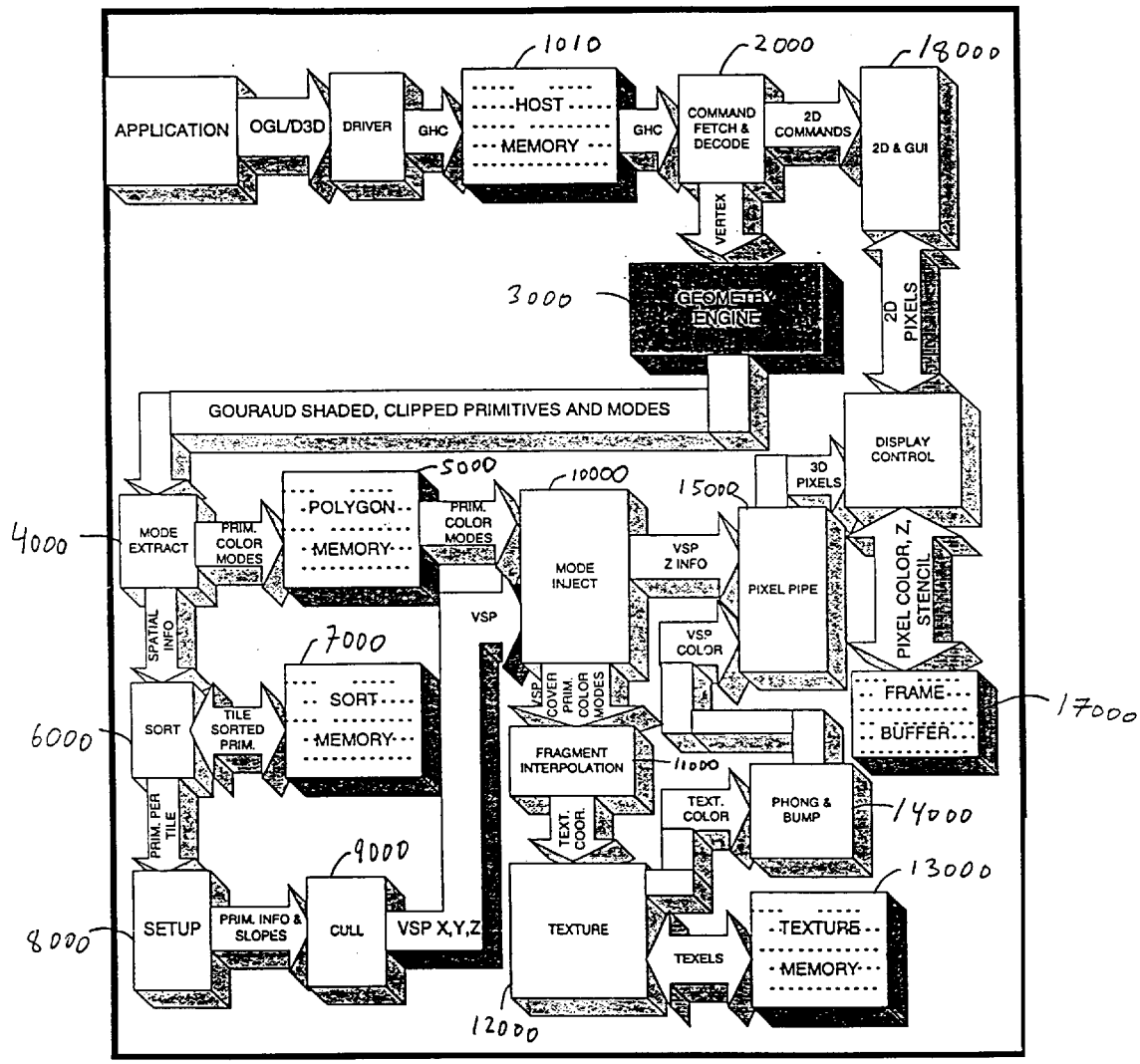
FIG. 7 is a method-flow diagram of the pipeline of FIG. 3.
Figure 11:
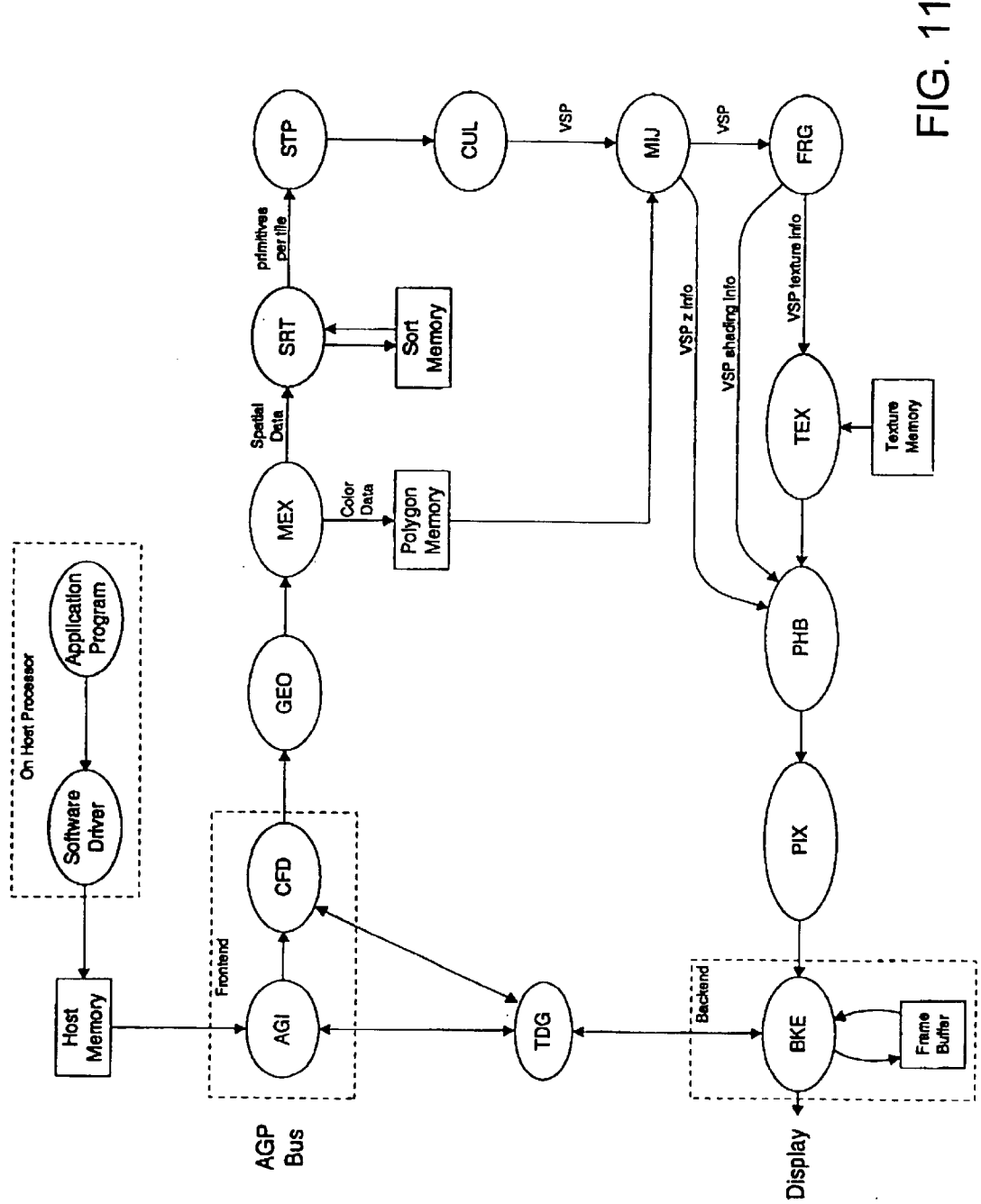
FIGS. 11 and 12 are alternative embodiments of a 3D-graphics pipeline incorporating the invention.
Figure 12:
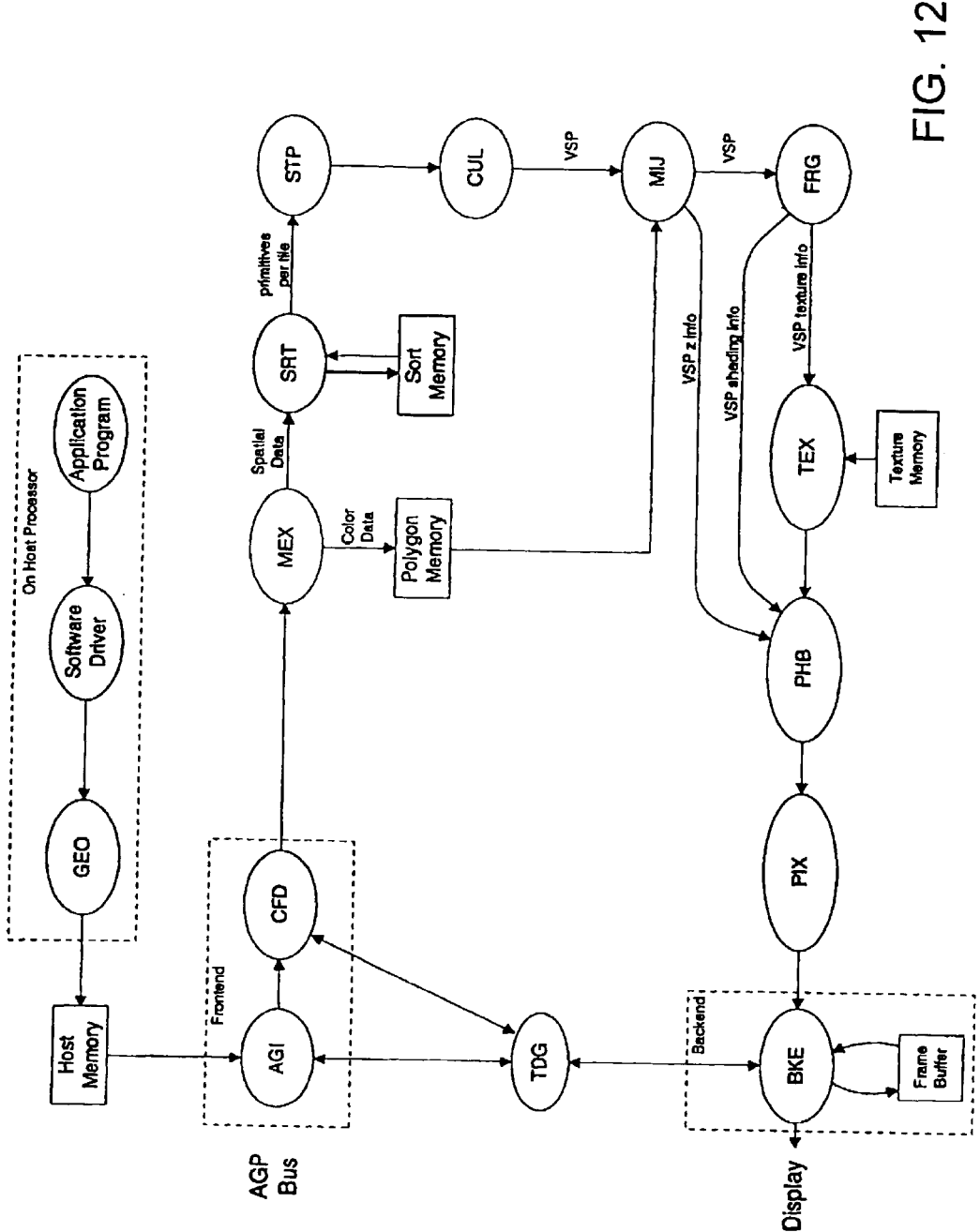

FIG. 7 is a method-flow diagram of the pipeline of FIG. 3. FIGS. 11 and 12 are alternative embodiments of a 3D-graphics pipeline incorporating the invention.

The command-fetch-and-decode block 841 handles communication with the host computer through the graphics port. It converts its input into a series of packets, which it passes to the geometry block 842. Most of the input stream consists of geometrical data, that is to say, lines, points and polygons. The descriptions of these geometrical objects can include colors, surface normals, texture coordinates and so on. The input stream also contains rendering information such as lighting, blending modes and buffer functions.

The geometry block 842 handles four major tasks: transformations, decompositions of all polygons into triangles, clipping and per-vertex lighting calculations for Gouraud shading.

The geometry block 842 transforms incoming graphics primitives into a uniform coordinate space ("world space"). It then clips the primitives to the viewing volume ("frustum"). In addition to the six planes that define the viewing volume (left, right, top, bottom, front and back), the Subsystem provides six user-definable clipping planes. After clipping, the geometry block 842 breaks polygons with more than three vertices into sets of triangles to simplify processing.

Finally, if there is any Gouraud shading in the frame, the geometry block 842 calculates the vertex colors that the fragment block 848 uses to perform the shading.

The mode-extraction block 843 separates the data stream into two parts: vertices and everything else. Vertices are sent to the sort block 844. Everything else (lights, colors, texture coordinates, etc.), it stores in the polygon memory 84E, whence it can be retrieved by the mode-injection block 847. The polygon memory 84E is double buffered, so the mode-injection block 847 can read data for one frame while the mode-extraction block 843 is storing data for the next frame.

The mode data stored in the polygon memory falls into three major categories: per-frame data (such as lighting), per-primitive data (such as material properties) and per-vertex data (such as color). The mode-extraction and mode-injection blocks 843, 847 further divide these categories to optimize efficiency.

For each vertex, the mode-extraction block 843 sends the sort block 844 a packet containing the vertex data and a pointer (the "color pointer") into the polygon memory 84E. The packet also contains fields indicating whether the vertex represents a point, the endpoint of a line or the corner of a triangle. The vertices are sent in a strictly time-sequential order, the same order in which they were fed into the pipeline. The packet also specifies whether the current vertex forms the last one in a given primitive, that is to say, whether it completes the primitive. In the case of triangle strips ("fans") and line strips ("loops"), the vertices are shared between adjacent primitives. In this case, the packets indicate how to identify the other vertices in each primitive.

The sort block 844 receives vertices from the mode-extraction block 843 and sorts the resulting points, lines and triangles by tile. (A tile is a data structure described further below.) In the double-buffered sort memory 84D, the sort block 844 maintains a list of vertices representing the graphic primitives and a set of tile pointer lists, one list for each tile in the frame. When the sort block 844 receives a vertex that completes a primitive, it checks to see which tiles the primitive touches. For each tile a primitive touches, the sort block adds a pointer to the vertex to that tile's tile pointer list.

When the sort block 844 has finished sorting all the geometry in a frame, it sends the data to the setup block 845. Each sort-block output packet represents a complete primitive. The sort block 844 sends its output in tile-by-tile order: all of the primitives that touch a given tile, then all of the primitives that touch the next tile, and so on. Thus, the sort block 844 may send the same primitive many times, once for each tile it touches.

The setup block 845 calculates spatial derivatives for lines and triangles. The block 845 processes one tile's worth of data, one primitive at a time. When the block 845 is done, it sends the data on to the cull block 846.

The setup block 845 also breaks stippled lines into separate line segments (each a rectangular region) and computes the minimum z value for each primitive within the tile.

Each packet output from the setup block 845 represents one primitive: a triangle, line segment or point.

The cull block 846 accepts data one tile's worth at a time and divides its processing into two steps: SAM culling and sub-pixel culling. The SAM cull discards primitives that are hidden completely by previously processed geometry. The sub-pixel cull takes the remaining primitives (which are partly or entirely visible) and determines the visible fragments. The sub-pixel cull outputs one stamp's worth of fragments at a time, herein a "visible stamp portion." (A stamp is a data structure described further below.)

Figure 9:
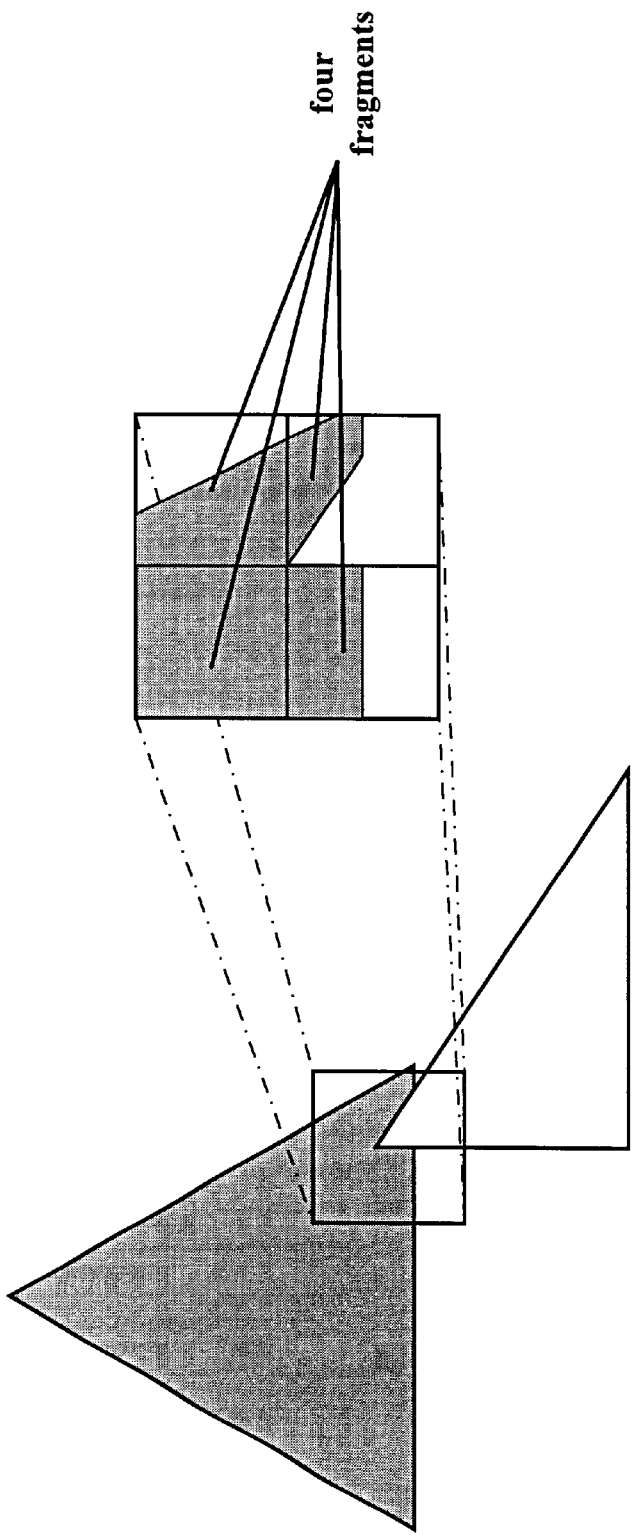
FIG. 9 shows an example of how the cull block produces fragments from a partially obscured triangle.

FIG. 9 shows an example of how the cull block 846 produces fragments from a partially obscured triangle. A visible stamp portion produced by the cull block 846 contains fragments from only a single primitive, even if multiple primitives touch the stamp. Therefore, in the diagram, the output VSP contains fragments from only the gray triangle. The fragment formed by the tip of the white triangle is sent in a separate VSP, and the colors of the two VSPs are combined later in the pixel block 84B.

Each pixel in a VSP is divided into a number of samples to determine how much of the pixel is covered by a given fragment. The pixel block 84B uses this information when it blends the fragments to produce the final color of the pixel.

The mode-injection block 847 retrieves block-mode information (colors, material properties, etc.) from the polygon memory 84E and passes it downstream as required. To save bandwidth, the individual downstream blocks cache recently used mode information. The mode-injection block 847 keeps track of what information is cached downstream and only sends information as necessary.

The main work of the fragment block 848 is interpolation. The block 848 interpolates color values for Gouraud shading, surface normals for Phong shading and texture coordinates for texture mapping. It also interpolates surface tangents for use in the bump-mapping algorithm if bump maps are in use.

The fragment block 848 performs perspective-corrected interpolation using barycentric coefficients.

The texture block 849 applies texture maps to the pixel fragments. Texture maps are stored in the texture memory 84F. Unlike the other memory stores described previously, the texture memory 84F is single buffered. It is loaded from the memory 820 using the graphics port interface.

Textures are mip-mapped. That is to say, each texture comprises a series of texture maps at different levels of detail, each map representing the appearance of the texture at a given distance from the eye point. To reproduce a texture value for a given pixel fragment, the text block 849 performs tri-linear interpolation from the texture maps, to approximate the correct level of detail. The texture block 849 also performs other interpolation methods, such as anisotropic interpolation.

The texture block 849 supplies interpolated texture values (generally as RGBA color values) to the Phong block 84A on a per-fragment basis. Bump maps represent a special kind of texture map. Instead of a color, each texel of a bump map contains a height field gradient.

The Phong block 84A performs Phong shading for each pixel fragment. It uses the material and lighting information supplied by the mode-injection block 847, the texture colors from the texture block 849 and the surface normal generated by the fragment block 848 to determine the fragment's apparent color. If bump mapping is in use, the Phong block 847 uses the interpolated height field gradient from the texture block 849 to perturb the fragment's surface normal before shading.

The pixel block 84B receives VSPs, where each fragment has an independent color value. The pixel bock 84B performs a scissor test, an alpha test, stencil operations, a depth test, blending, dithering and logic operations on each sample in each pixel. When the pixel block 84B has accumulated a tile's worth of finished pixels, it combines the samples within each pixel (thereby performing antialiasing of pixels) and sends then to the back end 84C for storage in the framebuffer 84G.

Figure 10:
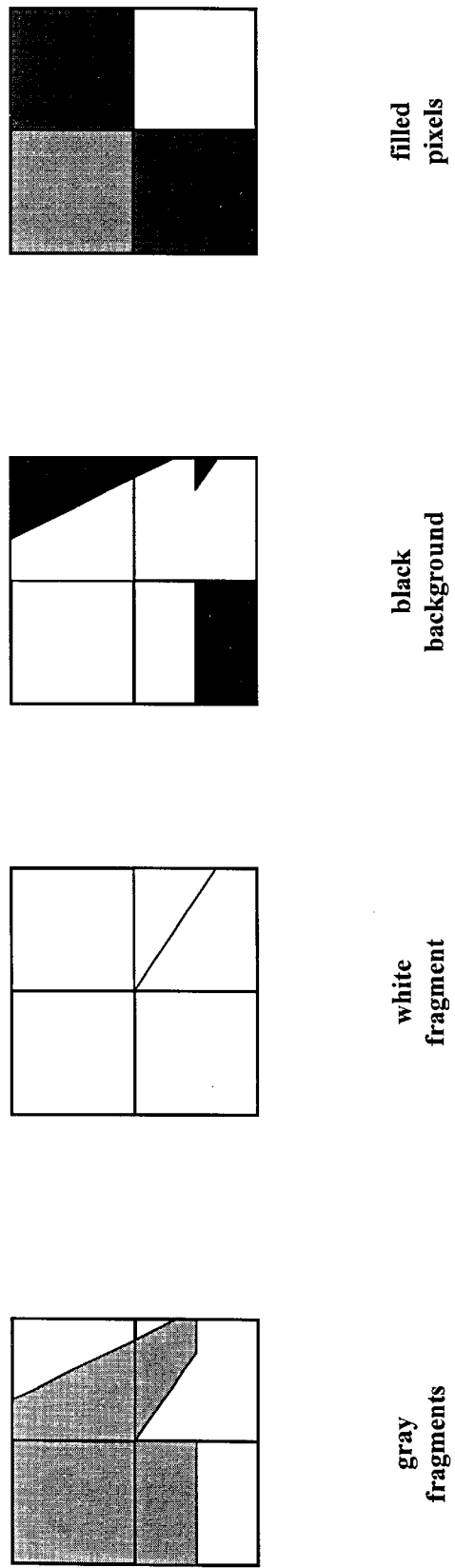
FIG. 10 demonstrates how the pixel block processes a stamp's worth of fragments.

FIG. 10 shows a simple example of how the pixel block 84B may process a stamp's worth of fragments. In this example, the pixel block receives two VSPs, one from a gray triangle and one from a white triangle. It then blends the fragments and the background color to produce the final pixels. In this example, the block 84B weights each fragment according to how much of the pixel it covers or, to be more precise, by the number of samples it covers. As mentioned before, this is a simple example. The apparatus performs much more complex blending.

(The pixel-ownership test is a part of the window system and is left to the back end 84C.)

The back-end block 84C receives a tile's worth of pixels at a time from the pixel block 84B and stores them into the framebuffer 84G. The back end 84C also sends a tile's worth of pixels back to the pixel block 84B because specific framebuffer values can survive from frame to frame. For example, stencil-bit values can remain constant over many frames but can be used in all of those frames.

In addition to controlling the framebuffer 84G, the back-end block 84C performs pixel-ownership tests, 2D drawing and sends the finished frame to the output devices. The block 84C provides the interface between the framebuffer 84G and the monitor 831 and video output.

The Pixel Block

The pixel block 84B is the last block before the back end 84C in the 3D pipeline 840. It is responsible for performing per-fragment operations. In addition, the pixel block 84B performs sample accumulation for anti-aliasing.

The pipeline stages before the pixel block 84B convert primitives into VSPs. The sort block 844 collects the primitives for each tile. The cull block 846 receives the data from the sort block in tile order and culls out parts of the primitives that do not contribute to the rendered images. The cull block 846 generates the VSPs. The texture and the Phong block units 849, 84A also receive the VSPs and are responsible for the texturing and lighting of the fragments, respectively.

Figure 2:
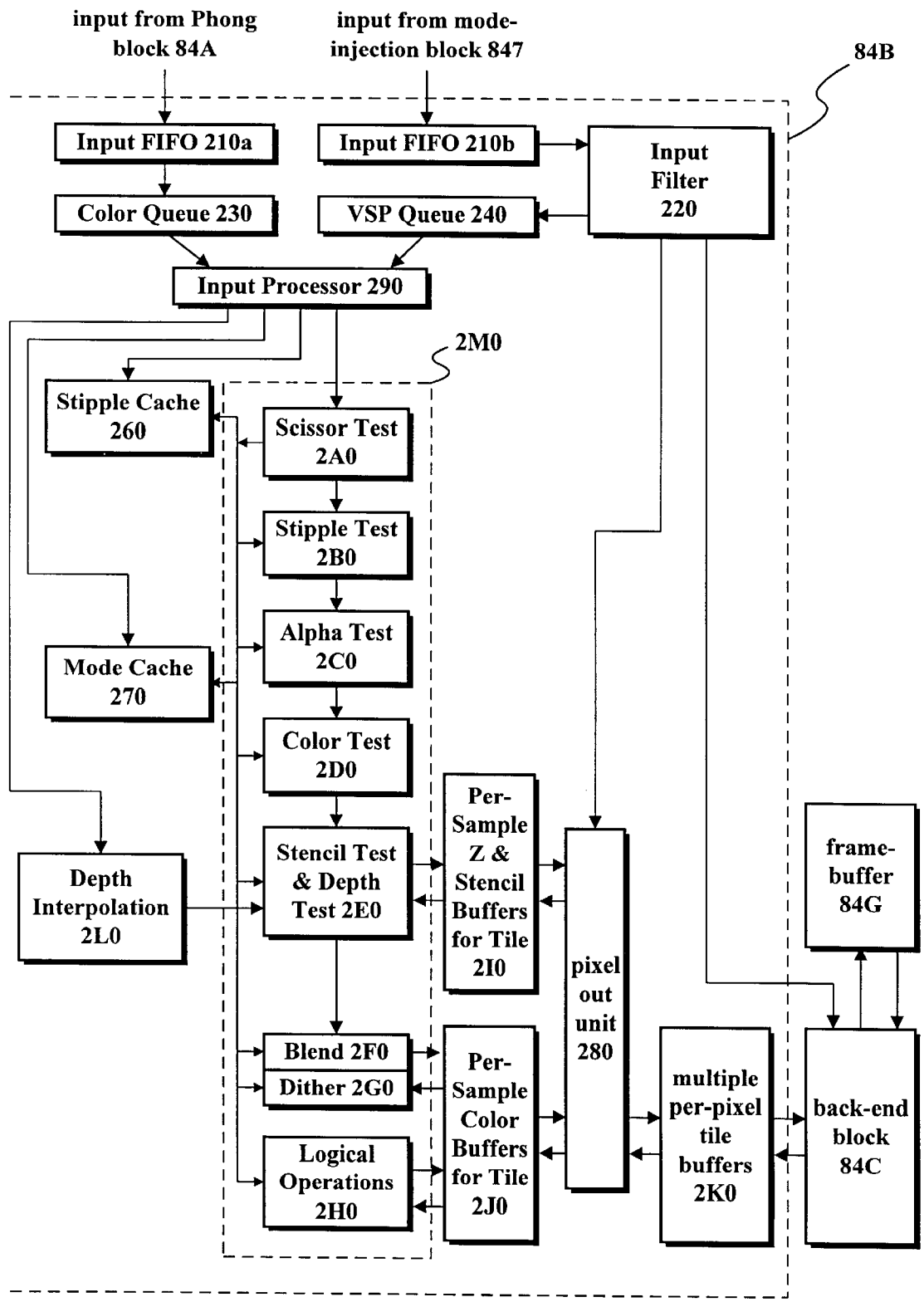
FIG. 2 is a block diagram illustrating the components and data flow in the pixel block.

FIG. 2 is a block diagram illustrating the components and data flow in the pixel block 84B. The block 84B includes FIFOs 210, an input filter 220 and queues 230, 240. The pixel block 84B also includes an input processor 290, caches 260, 270 and a depth-interpolation unit 2L0. Also in pixel block 84B is a 3D pipeline 2M0 including scissor-, stipple-, alpha-, color- and stencil/Z-test units 2A0, 2B0, 2C0, 2D0, 2E0, as well as blending, dithering and logical-operations units 2F0, 2G0, 2H0. Per-sample stencil and z buffers 2I0, per-sample color buffers 2J0, the pixel-out unit 280 and the per-pixel tile buffers 2K0 also help compose the pixel block 84B.

In FIG. 2, the input FIFOs 210*a* and 201*b* receive inputs from the Phong block 847 and the mode-injection block 847, respectively. The input FIFO 210*a* outputs to the color queue 230, while the input FIFO 210*b* outputs to the input filter 220.

The input filter outputs to the pixel-out unit 280, the back-end block 84C and the VSP queue 240.

The input processor 290 receives inputs from the queues 230, 240 and outputs to the stipple and mode caches 260, 270, as well as to the depth-interpolation unit 2L0 and the 3D pipeline 2M0.

The first stage of the pipeline 2M0, the scissor-test unit 2A0, receives input from the input processor 290 and outputs to the stipple-test unit 2B0. The unit 2B0 outputs to the alpha-test unit 2C0, which outputs to the color-test unit, which outputs to the stencil/z-test unit 2E0, which outputs to the blending/dithering unit 2F0. The stencil/z-test unit 2E0 also communicates with the per-sample z and stencil buffers 2I0, while the blending/dithering unit 2F0 and the logical-operations unit 2H0 both communicate with the per-sample color buffers 2J0.

The components of the pipeline 2M0, the scissor-, stipple-, alpha-, color- and stencil/Z-test units 2A0, 2B0, 2C0, 2D0, 2E0 and the blending, dithering and logical-operations units 2F0, 2G0, 2H0 all receive input from the stipple and mode caches 260, 270. The stencil/Z-test unit 2E0 also receives inputs from the depth-interpolation unit 2L0.

Towards the back-end side, the pixel-out unit 280 communicates with the per-sample z, stencil and color buffers 2I0, 2J0 as well as with the per-pixel buffers 2K0. The per-pixel buffers 2K0 and the back-end block 84C are in communication.

As mentioned above, the pixel block 84B communicates with the Phong, mode-injection and back-end blocks 847, 84A, 84C. More particularly, the pixel block 84B receives input from the mode-injection and Phong blocks 847, 84A. The pixel block 84B receives VSPs and mode data from the mode-injection block 847 and receives fragment colors for the VSPs from the Phong block 84A. (The Phong block 84A may also supply per-fragment depth or stencil values for VSPs.) The fragment colors for the VSPs arrive at the pixel block 84B in the same order as the VSPs.

The pixel block 84B processes the data for each visible sample according to maintained mode settings. When the pixel block 84B finishes processing all stamps for the current tile, it signals the pixel-out unit 280 to output the color, z and stencil buffers for the tile.

The pixel-out unit 280 processes the pixel samples to generate color, z and stencil values for the pixels. These pixel values are sent to the back-end block 84C which has the memory controller for the framebuffer 84G. The back-end block 84C prepares the current tile buffers for rendering of geometry (VSPs) by the pixel block 84B. This may involve loading of the existing color, z C, and stencil values from the framebuffer 84G.

In one embodiment, the on-chip per-sample z, stencil and color buffers 2I0, 2J0 are double buffered. Thus, while the pixel-out unit 280 is sending one tile to the back-end block 84C, the depth and blend units 2E0, 2F0 can write to a second tile. The per-sample color, z- and stencil buffers 2I0, 2J0 are large enough to store one tile's worth of data.

There is also a set of per-pixel z, stencil and color buffers 2K0 for each tile.

These per-pixel buffers 2K0 are an intermediate storage interfacing with the back-end block 84C.

The pixel block 84B also receives some packets bound for the back-end block 84C from the mode-injection block 847. The input filter 220 appropriately passes these packets on to (the prefetch queue of) the back end 84C, where they are processed in the order received. Some packets are also sent to (the input queue in) the pixel-out unit 280.

As mentioned before, the pixel block 84B receives input from the mode-injection and Phong blocks 847 and 84A. There are two input queues to handle these two inputs. The data packets from the mode-injection block 847 go to the VSP queue 240 and the fragment color (and depth or stencil if enabled) packets from the Phong block 84A go to the color queue 230. The mode-injection block 847 places the data packets in the input FIFO 210. The input filter 220 examines the packet header and sends the data bound for the back-end block 84C to the back-end block 84C and the data packets needed by the pixel block 84B to the VSP queue 240. The majority of the packets received from the mode-injection block 847 are bound for the VSP queue 240, some go only to the back-end block 84C and some are copied into the VSP queue 240 as well as sent to the back-end and the pixel-out units 84C, 280.

A brief explanation of the need and mechanism for tile preparation follows. A typical rendering sequence may have the following operations: (1) initialize the color, z and stencil buffers 2J0, 2I0 to their clear values, if needed, (2) blt background image(s) into the buffer(s) 2J0, 2I0, if needed, (3) render geometry, (4) blt again, (5) render some more geometry, (6) complete and flip. If the blt operation (2) covers the entire window, a clearing operation for that buffer may not be needed. If the blt covers the partial window, a clear may be needed. Furthermore, the initialization and bIt (2) operations may happen in reverse order. That is to say, there may be a blt to (perhaps) the whole window followed by a clearing of a part of the window. The pre-geometry bits that cover the entire window do not require a scissor test. Tile alignment and scaling may be carried out by the back-end block 84C as image read back into the tile buffers. The post-geometry bits and the bits that cover part of the window or involve scaling are implemented as textured primitives in the pipeline.

Similarly, the clear operation is broken into two kinds. The pre-geometry entire-window-clear operation is carried out in the pixel-out unit 280, and the clear operation that covers only part of the window (and/or is issued after some geometry has been rendered) is carried out in the pixel-block pipeline. Both the pixel block 84B (the pixel-out unit 280) and the back-end block 84C are aware of the write masks for various buffers at the time the operation is invoked. In fact, the back-end block 84C uses the write 21 masks to determine if it needs to read back the tile buffers. The readback of tile buffers may also arise when the rendering of a frame causes the polygon or sort memory 84E, 84D to overflow.

In some special cases, the pipeline may break a user frame into two or more sequential frames. This may happen due to a context switch or due to polygon or sort memory 84E, 84D to overflow. Thus, for the same user frame, a tile may be visited more than once in the pixel block 84B. The first time a tile is encountered, the pixel block 84B (most likely the pixel-out unit 280) may need to clear the tile buffers 2I0, 2J0 with the "clear values" prior to rendering. For rendering the tiles in subsequent frames, the pixel color, z and stencil values are read back from the framebuffer memory 84G.

Another very likely scenario occurs when the z buffer 2I0 is cleared and the color and stencil buffers 2J0, 2I0 are loaded into tiles from a pre-rendered image. Thus, as a part of the tile preparation, two things happen. The background image is read back from the framebuffer memory 84G into the buffers that are not enabled for clear, and the enabled buffers (corresponding to the color, z and stencil) are cleared. The pipeline stages upstream from the pixel block 84B are aware of these functional capabilities, since they are responsible for sending the clear information.

The pixel block 84B compares the z values of the incoming samples to those of the existing samples to decide which samples to keep. The pixel block 84B also provides the capability to minimize any color bleeding artifacts that may arise from the splitting of a user frame.

DATA STRUCTURES

Samples, Pixels, Stamps and Tiles

Figure 4:
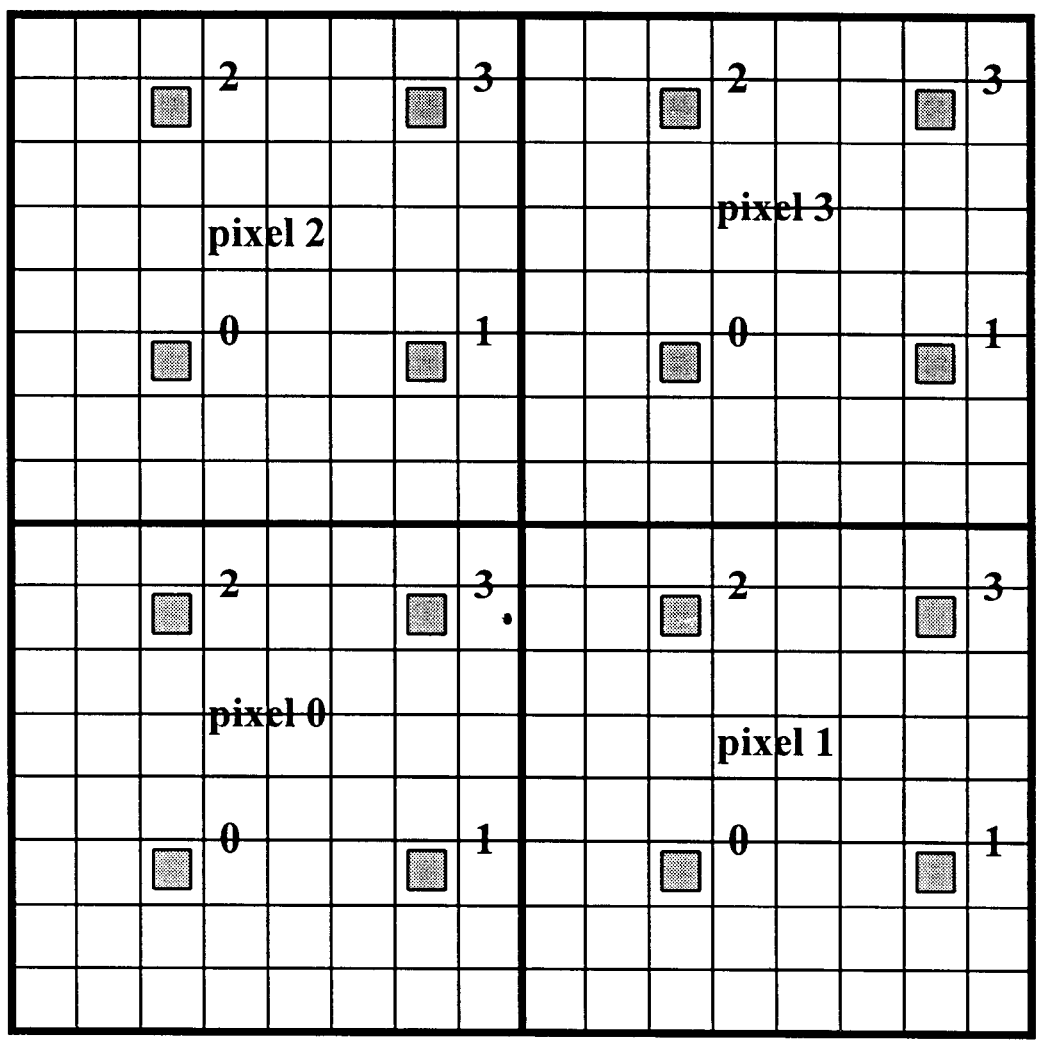
FIG. 4 illustrates the relationship of samples to pixels and stamps and the default sample grid, count and locations according to one embodiment.

A first data structure is a sample. Each pixel in a VSP is divided into a number of samples. Given a pixel divided into an n-by-m grid, a sample corresponds to one of the n*m subdivisions. FIG. 4 illustrates the relationship of samples to pixels and stamps in one embodiment.

The choices of n and m, as well as how many and which subdivisions to select as samples are all programmable in the co-processor 840. The grid, sample count and sample locations, however, are fixed until changed. Default n, m, count and locations are set at reset. FIG. 4 also illustrates the default sample grid, count and locations according to one embodiment.

Each sample has a dirty bit, indicating whether either of the sample's color or alpha value has changed in the rendering process.

A next data structure is a stamp. A stamp is a is a j-by-k multi-pixel grid within an image. In one embodiment, a stamp is a 2×2-pixel area.

A next data structure is a tile. A tile is an h-by-i multi-stamp area within an image. In one embodiment, a tile is an 8×8-stamp area, that is to say, a 16×6-pixel area of an image.

A next data structure is a packet. A packet is a structure for transferring information. Each packet consists of a header followed by packet data. The header indicates the type and format of the data that the packet contains.

Individual packet types as follows are described in detail herein:

Begin_Frame, Prefetch_Begin_Frame, Begin_Tile, Prefetch_Begin_Tile, End_Frame and Prefetch_End_Frame, Clear, pixel-mode Cache_Fill, stipple Cache_Fill, VSP, Color and Depth.

The Begin_Frame and Prefetch_Begin_Frame Packets

Begin_Frame and Prefetch_Begin_Frame packets have the same content except that their headers differ. A Begin_Frame packet signals the beginning of a user frame and goes to the pixel block 84B (the VSP queue 240). The Prefetch_Begin_Frame packet signals the beginning of a frame and is dispatched to the back-end block 84C (the back-end block input queue) and pixel out-block prefetch queues.

For every Begin_Frame packet, there is a corresponding End_Frame packet. However, multiple End_Frame packets may correspond to the same user frame. This can happen due to frame splitting on overflow, for example.

Table 1 illustrates the format in one embodiment of the Begin_Frame and Prefetch_Begin_Frame packets. They contain Blocking_Interrupt. Window_X_Offset, Window_Y_Offset, Pixel_Format, No_Color_Buffer, No_Z_Buffer, No_Saved_Z_Buffer, No_Stencil_Buffer, No_Saved_Stencil_Buffer, Stencil_Mode, Depth_Output_Selection, Color_Output_Selection, Color_Output_Overflow_Selection and Vertical_Pixel_Count fields. A description of the fields follows.

Software uses the Block_3D_Pipe field to instruct the back-end block 84C to generate a blocking interrupt.

The WinSourceL, WinSourceR, WinTargetL and WinTargetR fields identify the window IDs of various buffers. The back end 84C uses them for pixel-ownership tests.

The Window_X_Offset and Window_Y_Offset are also for the back end 84C (for positioning the BLTs and such).

The Pixel_Format field specifies the format of pixels stored in the framebuffer 84G. The pixel block 84B uses this for format conversion in the pixel-out unit 280. One embodiment supports 4 pixel formats, namely 32-bits-per-pixel ARGB, 32-bits-per-pixel RGBA, 16-bits-per-pixel RGB_5_6_5, and 8-bits-per-pixel indexed color buffer formats.

The SrcEqTarL and SrcEqTarR fields indicate the relationship between the source window to be copied as background in the left and right target buffers. The back end 84C uses them.

The No_Color_Buffer flag, if set, indicates that there is no color buffer and, thus, disables color buffer operations (such as blending, dithering and logical operations) and updates.

The No_Saved_Color_Buffer flag, if set, disables color output to the framebuffer 84G. The color values generated in the pixel block 84B are not to be saved in the framebuffer because there is no color buffer for this window in the framebuffer 84G.

The No_Z_Buffer, if set, indicates there is no depth buffer and, thus, disables all depth-buffer operations and updates.

The No_Saved_Z_Buffer flag, if set, disables depth output to the framebuffer 84G. The depth values generated in the pixel block 84B are not to be saved in the framebuffer 84G because there is no depth buffer for this window in the framebuffer 84G.

The No_Stencil_Buffer flag, if set, indicates there is no stencil buffer and, thus, disables all stencil operations and updates.

The No_Saved_Stencil_Bufferfer flag, if set, disables stencil output to the framebuffer 84G. The stencil values generated in the pixel block 84B are not to be saved in the framebuffer 84G because there is no stencil buffer for this window in the framebuffer 84G.

The Stencil_Mode flag, if set, indicates the stencil operations are on a per-sample basis (with 2 bits/sample, according to one embodiment) versus a per-pixel basis (with 8 bits per pixel, according to that embodiment).

The pixel block 84B processes depth values on a per-sample basis but outputs them on a pixel basis. The Depth_Output_Selection field determines how the pixel block 84B chooses the per-pixel depth value from amongst the per-sample depth values.

In one embodiment, the field values are FIRST, NEAREST and FARTHEST. FIRST directs the selection of the depth value of the sample numbered 0 (that is, the first sample, in a zero-indexed counting schema) as the per-pixel depth value. NEAREST directs the selection of the depth value of the sample nearest the viewpoint as the per-pixel depth value. Similarly, FARTHEST directs the selection of the depth value of the sample farthest from the viewpoint as the per-pixel depth value.

When a frame overflow has not occurred, the Color_Output_Selection field determines the criterion for combining the sample colors into pixels for color output. However, when a frame overflow does occur, the Color_Output_Overflow_Selection field determines the criterion for combining the sample colors into pixels for color output. In one embodiment, the Color_Output_Selection and Color_Output_Overflow_Selection state parameters have a value of FIRST_SAMPLE, WEIGHTED, DIRTY_SAMPLES or MAJORITY. FIRST_SAMPLE directs the selection of the color of the first sample as the per-pixel color value. WEIGHTED directs the selection of a weighted average of the pixel's sample colors as the per-pixel color value. DIRTY_SAMPLES directs the selection of the average color of the dirty samples, and MAJORITY directs the selection of (1) the average of the samples' source colors for dirty samples or (2) the average of the samples' buffer colors for non-dirty samples—whichever of the dirty samples and clean samples groups is the more numerous.

The Vertical_Pixel_Count field specifies the number of pixels vertically across the window.

The StencilFirst field determines how the sample stencil values are converted to the stencil value of the pixel. If StencilFirst is set, then the Pixel block assigns the stencil value of the sample numbered 0 (that is, the first sample, in a zero-indexed counting schema) as the per-pixel stencil value. Otherwise, majority rule is used is determining how the pixel stencil value gets updated and assigned.

The End_Frame and Prefetch_End_Frame Packets

End_Frame and Prefetch_End_Frame indicate the end of a frame. The Prefetch_End_Frame packet is sent to the back-end prefetch queue and the End_Frame packet is placed in the VSP queue 240.

Table 2 describes the format in one embodiment of the End_Frame and Prefetch_End_Frame packets. (The packet headers values differ, of course, in order to distinguish the two types of packets.) They contain a packet header, Interrupt_Number, Soft_End_Frame, Buffer_Over_Occurred fields.

The Interrupt_Number is used by the back end 84C.

The SoftEndFrame and Buffer_Over_Occurred fields each independently indicates the splitting of a user frame into multiple frames. Software can cause an end of frame without starting a new user frame by asserting Soft_End_Frame. The effect is exactly the same as with the Buffer_Over_Occurred field, which is set when the mode-extraction unit 843 overflows a memory 84D, 84E.

The Begin_Tile and Prefetch_Begin_Tile Packets

Begin_Tile and Prefetch_Begin_Tile packets indicate the end of the previous tile, if any, and the beginning of a new tile. Each pass through a tile begins with a Begin_Tile packet. The sort block 844 outputs this packet type for every tile in a window that has some activity.

Table 5 describes the format, in one embodiment, of the Begin_Tile and Prefetch_Begin_Tile packets. (The packet header values differ, of course, in order to distinguish the two types of packets.) They contain First_Tile_In_Frame, Breakpoint_Tile, Begin_SuperTile, Tile_Right, Tile_Front, Tile_Repeat, Tile_Begin_SubFrame and Write_Tile_ZS flags, as well as Tile_X_Location and Tile_Y_Location fields. The Begin_Tile and Prefetch_Begin Tile packets also contain Clear_Color_Value, Clear_Depth_Value, Clear_Stencil_Value, Backend_Clear_Color, Backend_Clear_Depth, Backend_Clear_Stencil and Overflow_Frame fields. A description of the fields follows.

The First_Tile_In_Frame flag indicates that the sort block 844 is sending the data for the first tile in the frame. (Performance counters for the frame can be initialized at this time.) If this tile has multiple passes, the First_Tile_In_Frame flag is asserted only in the first pass.

Breakpoint_Tile indicates the breakpoint mechanism for the pipeline 840 is activated.

Begin_SuperTile indicates that the sort block 844 is sending the data for the first tile in a super-tile quad. (Performance counters related to the super-tile can be initialized at this time.)

(T he pixel block 84B does not use the Tile_Right, Tile_Front, Tile_Repeat, Tile_Begin_SubFrame and Write_Tile_ZS flags.)

Tile_X_Location and Tile_Y_Location specify the starting x and y locations, respectively, of the tile within the window. These parameters are specified as tile counts.

Clear_Color_Value, Clear_Depth_Value and Clear_Stencil_Value specify the values the draw, z- and stencil buffer pixel samples receive on a respective clear operation. The Backend_Clear_Color, Backend_Clear_Depth and Backend_Clear_Stencil flags indicate whether the back-end block 84C is to clear the respective draw, z- and/or stencil buffers. When a flag is TRUE, the back end 84C does not read the respective information from the framebuffer 84G. The pixel block 84B actually performs the clear operation.

Backend_Clear_Color indicates whether the pixel-out unit 280 is to clear the draw buffer. If this flag is set, the back end 84C does not read in the color buffer values. Instead, the pixel-out unit 280 clears the color tile to Clear_Color_Value. Conversely, if the flag is not set, the back-end block 84C reads in the color buffer values.

The Backend_Clear_Depth field indicates whether the pixel-out unit 280 is to clear the z buffer. The pixel-out unit 280 initializes each pixel sample on the tile to the Depth_Clear_Value before the pixel block 84B processes any geometry. If this bit is not set, the back-end block 84C reads in the z values from the framebuffer memory.

The Backend_Clear_Stencil field indicates the stencil-buffer bits that the pixel-out unit 280 is to clear. The back-end block 84C reads the stencil values from the framebuffer memory of this flag is not set. The pixel-out unit 280 clears the stencil pixel buffer to the Clear_Stencil_Value.

The Overflow_Frame flag indicates whether this tile is a result of an overflow in the mode-extraction block 843, that is to say, whether the current frame is a continuation of the same user frame as the last frame. If this bit is set, Color_Output_Overflow_Selection determines how the pixel-color value is output. If the flag is not set, Color_Output_Selection determines how the pixel-color value is output.

Tile_Begin_SubFrame is used to split the data within the tile into multiple sub-frames. The data within each sub-frame may be iteratively processed by the pipeline for sorted transparency, anti-aliasing, or other multi-pass rendering operations.

The Clear Packet

The Clear packet indicates that the pixel block 84B needs to clear a tile. This packet goes to the VSP queue 240.

Table 4 illustrates the format in one embodiment of a Clear packet. It contains Header, Mode_Cache_Index, Clear_Color, Clear_Depth, Clear_Stencil, Clear_Color_Value, Clear_Depth_Value and Clear_Stencil_Value fields.

Clear_Color indicates whether the pixel block 84B is to clear the color buffer, setting all values to Clear_Color_Value or Clear_Index_Value, depending on whether the window is in indexed color mode.

Clear_Depth and Clear_Stencil indicate whether the pixel block 84B is to clear the depth and/or stencil buffer, setting values to Clear_Depth_Value and/or Clear_Stencil_Value, respectively.

The Pixel-Mode Cache_Fill Packet

A pixel-mode Cache_Fill packet contains the state information that may change on a per-object basis. While all the fields of an object-mode Cache_Fill packet will seldom change with every object, any one of them can change depending on the object being rendered.

Tables 6 and 7 illustrate the format and content in one embodiment of a pixel-mode Cache_Fill packet. The packet contains Header, Mode_Cache_Index, Scissor_Test_Enabled, $x_{Scissor\_Min}$, $x_{Scissor\_Max}$, $y_{Scissor\_Min}$, $y_{Scissor\_Max}$, Stipple_Test_Enabled, Function$_{ALPHA}$, alpha$_{REFERENCE}$, Alpha_Test_Enabled, Function$_{COLOR}$, color$_{MIN}$, color$_{MAX}$, Color_Test_Enabled, stencil$_{REFERENCE}$, Function$_{STENCIL}$, Function$_{DEPTH}$, mask$_{STENCIL}$, Stencil_Test_Failure_, Operation, Stencil_Test_Pass_Z_Test_Failure_Operation, Stencil_and_Z_Tests_Pass_Operation, Stencil_Test_Enabled, write_mask$_{STENCIL}$, Z_Test_Enabled, Z_Write_Enabled, DrawStencil, write_mask$_{COLOR}$, Blending.Enabled, Constant_Color$_{BLEND}$, Source_Color_Factor, Destination_Color_Factor, Source_Alpha_Factor, Destination_Alpha_Factor, Color_LogicBlend_Operation, Alpha_LogicBlend_Operation and Dithering_Enabled fields. A description of the fields follows.

Mode_Cache_Index indicates the index of the entry in the mode cache 270 this packet's contents are to replace.

Scissor_Test_Enabled, Stipple_Test_Enabled, Alpha_Test_Enabled, Color_Test_Enabled, Stencil_Test_Enable and Z_Test_Enabled are the respective enable flags for the scissor, stipple, alpha, color, stencil and depth tests. Dithering_Enabled enables the dithering function.

$x_{Scissor\_Min}$, $x_{Scissor\_Max}$, $y_{Scissor\_Min}$ and $y_{Scissor\_Max}$ specify the left, right, top and bottom edges, respectively, of the rectangular region of the scissor test.

Function$_{ALPHA}$, Function$_{COLOR}$, Function$_{STENCIL}$ and Function$_{DEPTH}$ indicate the respective functions for the alpha, color, stencil and depth tests.

alpha$_{REFERENCE}$ is the reference alpha value used in alpha test.

colors$_{MIN}$ and color$_{MAX}$ are, respectively, the minimum inclusive and maximum inclusive values for the color key.

stencil$_{REFERENCE}$ is the reference value used in The stencil test.

mask$_{STENCIL}$ is the stencil mask to AND the reference and buffer sample stencil values prior to testing.

Stencil_Test_Failure_Operation indicates the action to take on failure of the stencil test. Likewise, Stencil_Test_

Pass_Z_Test_Failure_Operation indicates the action to take on passage of the stencil test and failure of the depth test and Stencil_and_Z_Tests_Pass_Operation the action to take on passage of both the stencil and depth tests.

The write_mask$_{STENCIL}$ field is the stencil mask for the stencil bits in the buffer that are updated.

Z_Write_Enabled is a Boolean value indicating whether writing and updating of the depth buffer is enabled.

The DrawStencil field indicates that the pixel block 84B is to interpret the second data value from the Phong block 84A as stencil data.

write_mask$_{COLOR}$ is the mask of bitplanes in the draw buffer that are enabled. In color-index mode, the low-order 8 bits are the IndexMask.

Blending_Enabled indicates whether blending is enabled. If blending is enabled, then logical operations are disabled.

Constant_Color$_{BLEND}$ is the constant color for blending.

The Source_Color_Factor and Destination_Color_Factor fields are, respectively, the multipliers for source-derived and destination-derived sample colors. Source_Alpha_Factor is the multiplier for sample alpha values, while Destination_Alpha_Factor is a multiplier for sample alpha values already in the tile buffer.

The Color_LogicBlend_Operation indicates the logic or blend operation for color values, and Alpha_LogicBlend_Operation indicates the logic or blend operation for alpha values.

The Stipple Cache_Fill Packet

An next data structure is the stipple Cache_Fill packet.

Table 10 illustrates the structure and content of a stipple Cache_Fill packet according to one embodiment. The packet contains Stipple_Cache_Index and Stipple_Pattern fields. The Stipple_Cache_Index field indicates which of the stipple cache's entries to replace. The Stipple_Pattern field holds the stipple pattern.

In one embodiment, the stipple cache 260 has four entries, and thus the bit-size of the Stipple_Cache_Index is 2. (OpenGL sets the size of a stipple pattern to 1024 bits.)

The VSP Packet

Each visible stamp in a primitive has a corresponding VSP packet. Table 3 describes the format of a VSP packet according to one embodiment. It contains Mode_Cache_Index, Stipple_Cache_Index, Stamp_X_index, Stamp_Y_Index, Sample_Coverage_Mask, Z$_{REFERENCE}$, DzDx, DzDy and Is_MultiSample fields, a reference z value, Z$_{REFERENCE}$, and two depth slopes, $\partial z/\partial x$ and $\partial z/\partial y$. A VSP also contains an Is_MultiSample flag. A description of the fields follows.

A VSP packet contains indices for the mode and stipple cache entries in the mode and stipple caches 270, 260 that are currently active: Mode_Cache_Index and Stipple_Cache_Index. (The Phong block 84A separately supplies the color data for the VSP.)

In one embodiment, the stipple cache 270 has four entries, and thus the bit-size of the Stipple_Cache_Index field is two. The mode cache 260 has sixteen entries, and the bit-size of the Mode_Cache_Index field is four.

A VSP packet also contains Stamp_X_Index, Stamp_Y_Index and Is_MultiSample values. The Stamp_X_Index indicates the x index within a tile, while the Stamp_Y_Index indicates the y index within the tile. The Is_MultiSample flag indicates whether the rendering is anti-aliased or non anti-aliased. This allows programmatic control for primitive based anti-aliasing.

In one embodiment, sixty-four stamps compose a(n 8×8-stamp) tile. The bit sizes of the Stamp_X_Index and Stamp_Y_Index are thus three. With 16×6-pixel tiles and 2×2-pixel stamps, for example, the stamp indices range from 0 to 7.

A VSP packet also contains the sample coverage mask for a VSP, Sample_Coverage_Mask. Each sample in a stamp has a corresponding bit in a coverage mask. All visible samples have their bits set in the Sample_Coverage_Mask.

In one embodiment, sixteen samples compose a stamp, and thus the bit size of the Sample_Coverage_Mask is sixteen.

The z value of all samples in a stamp are computed with respect to the Z$_{REFERENCE}$ value, DzDx and DzDy.

In one embodiment, the Z$_{REFERENCE}$ value is a signed fixed point value with 28 integer and 3 fractional bits (s28.3), and DzDx and DzDy are signed fixed point (s27) values. These bit precisions are adequate for resulting 24-bits-per-sample depth values.

The Is_MultiSample flag indicates if the rendering is antialiased or non-antialiased. This field allows primitive-based anti-aliasing.

Z$_{REFERENCE}$, DzDx and DzDy values are passed on to the mode-injection block 847 from the cull block 846. The mode-injection block 847 sends these down to the pixel block 84B. The Pixel Depth packets arriving from the Phong block 84A are written into the color queue 230.

Color Packet

A Color packet gives the color values (that is to say, RGBA values) for a visible pixel in a stamp.

Table 8 illustrates the form and content of a Color packet according to one embodiment. Such a packet includes a Header and a Color field. In one embodiment, a color value has 32 bits distributed evenly over the red, green, blue and alpha values.

Depth/Stencil Information

A Depth packet conveys per-pixel depth or stencil information. Table 9 illustrates the form and content of a Depth packet according to one embodiment. Such a packet contains Header and Z fields. In one embodiment, the Z field is a 24-bit value interpreted as fragment stencil or fragment depth, depending on the setting of the DrawStencil flag in the applicable pixel mode.

State Parameters

The pixel block 84B maintains a number of state parameters that affect its operation. Tables 22 and 23 list the state parameters according to one embodiment. These state parameters correspond to their like-named packet fields. As such, the packet-field descriptions apply to the state parameters, and a repetition of the descriptions is omitted.

The exceptions are SampleLocations, SampleWeights, and EnableFlags. SampleLocations are the locations of the samples in the pixel specified on the 16×16 sub-pixel grid. Sample Weights are the fractional weights assigned to the samples. These weights are used in resolving the sample colors into pixel colors. An alternate embodiment could include these fields in some of the state packets (such as BeginFrame or BeginTile packet) to allow dynamic update of these parameters under software control for synchronous update with other processing.

The Enable_Flags include the Alpha_Test_Enabled, Color_Test_Enabled, Stencil_Test_Enabled, Z_Test_Enabled, Scissor_Test_Enabled, Stipple_Test_Enabled, Blending_Enabled and Dithering_Enabled Boolean values.

PROTOCOLS

The mode-injection and Phong blocks 847, 84A send input to the pixel block 84B by writing packets into its input queues 210. The pixel block 84B also communicates with the back-end block 84C, sending completed pixels to the framebuffer 84G and reading pixels back from the framebuffer 84G to blend with incoming fragments. (The pixel block 84B sends and receives a tile's worth of pixels at a time.)

The functional units within the pixel block 84B are described below. As color, alpha and stipple values are per-fragment data, the results of corresponding tests apply to all samples in the fragment. The same is true of the scissor test as well.

The pseudo-code for the data flow for one embodiment based on the per-fragment and per-sample computations is outlined below. This pseudo-code provides an overview of the operations of the pixel block 84B. The pseudo-code includes specific assumptions such as the size of the sub-pixel grid, number of samples etc.. These and other fixed parameters are implementation dependent.

```
DoPixel ( ) {
    for each stamp {
        for each pixel in the stamp {
            /* compute sample mask for pixel */
            mask_PIXEL = mask_SAMPLE & 0xF;
            mask_SAMPLE >>= 4;
            if (mask_PIXEL == 0)
                /* none of the samples is set */
                break;
            else if (Scissor_Test_Enabled && (!Passes_Scissor_Test( )))
                break;
            else if (Stipple_Test_Enabled && (!Passes_Stipple_Test( )))
                break;
            else if (Alpha_Test_Enabled && (!Passes_Alpha_Test( )))
                break;
            else if (Color_Test_Enabled && (!Passes_Color_Test( )))
                break;
            else if (Stencil_Test_Enabled && !No_Stencil_Buffer) {
                if (Stencil_Mode) {
                    /* per-pixel stencil */
                    if (!Passes_Pixel_Stencil_Test( )) {
                        doPixel_Stencil_Test_Failed_Operation( );
                        break;
                    }else {
                        Passes_Pixel_Z_Test( );
                    }
                } else {
                    /* per-sample stencil */
                    for each sample in the pixel {
                        Is_Valid_Sample = mask_PIXEL & 0x1;
                        mask_PIXEL >>= 1;
                        if (Is_Valid_Sample) {
                            if (!Passes_Sample_Stencil_Test( )) {
                                doSample_Stencil_Test_Failed_Operation( );
                                break;
                            } else if (Z_Test_Enabled
                                    &&(!Passes_Sample_Z_Test( ))) {
doSampleStencil_Test_Passed_Z_Test_Failed_Operation( );
                            } else {
                                    doSampleStencil_and_Z_Tests_Passed_Operation( );
                            }
                        }
                    }    /* for each sample in pixel */
                }
            } else {
                    /* if (!Stencil_Test_Enabled || No_Stencil_Buffer)*/
                    doPixelDepthTest ( );
            }
        }    /* for each pixel in stamp */
    }    /* for each stamp */
}    /* DoPixel( ) */
doPixelDepthTest ( ) {
boolean Is_First_Pass, Is_First_Fail;
        z_Pass_Count = z_Fail_Count = sample_number = 0;
        Is_First_Pass = Is_First_Failure = FALSE;
        for each sample {
            Is_Valid_Sample = mask_PIXEL & 0x1;
            mask_PIXEL >> 1;
            sample_number++;
            if (Is_Valid_Sample) {
                if (Z_Test_Enabled && !No_Z_Buffer) {
                    if (doSampleDepthTest( )) {
                        doBlendEtc( );
                            Z_Pass_Count++;
                            if (sample_number == 1)
                                Is_First_Pass = TRUE;
```

-continued

```
            }else {
                Z_Fail_Count++;
                if (sample_number == 1)
                    Is_First_Failure = TRUE;
            }
        } else {
            doBlendEtc( );
            Z_Pass_Count++;
            if (sample_number == 1)
                Is_First_Pass = TRUE;
            }
        }
    }
    if (Stencil_Test_Enabled && !No_Stencil_Buffer) }
        if (StencilFirst == 1) {
            if (Is_First_Pass)
                doPixelStencil_and_Z_Tests_Passed_Operation( );
            else if (Is_First_Failure)
                doPixelStencil_Test_Passed_Z_Test_Failed_Operation( );
        } else {
            if (z_Pass_Count >= z_Fail_Count)
                doPixelStencil_and_Z_Tests_Passed_Operation( );
            else
                doPixelStencil_Test_Passed_Z_Test_Failed_Operation( );
        }
} /* DoPixelDeptTest( ) */
boolean doSampleDepthTest( ) }
        if (!No_Z_Buffer) }
            doComputeDepth( );
            if (!depthTest)
                /* Compare z values according to depthFunc */
                return FALSE;
            else{
                set Z_Visible bit;
                updateDepthBuffer( );
                doBlendEtc( );
                return TRUE;
            }
        } else
            return TRUE;
}
doComputeDepth(index_PIXEL, index_SAMPLE) {        //pixel and sample number
are known
/* sub-pixel units per pixel in the X axis in one embodiment */
#define SUBPIXELS_PER_PIXEL_IN_X   16
/* bits to represent SUBPIXELS_PER_PIXEL_IN_X
#define SUBPIXEL_BIT_COUNT_X           log_2(SUBPIXELS_PER_PIXEL_IN_X)
/* pixels per stamp in the X axis in one embodiment */
#define PIXELS_PER_STAMP_IN_X   2
/* bits to represent PIXELS_PER_STAMP_IN_X */
#define PIXEL_BIT_COUNT_x              log_2(PIXELS_PER_STAMP_IN_X)
#define SUBPIXELS_PER_PIXEL_IN_Y   16
#define SUBPIXEL_BIT_COUNTy            log_2(SUBPIXELS_PER_PIXEL_IN_Y)
#define PIXELS_PER_STAMP_IN_Y   2
#define PIXEL_BIT_COUNT_Y              log_2(PIXELS_PER_STAMP_IN_Y)
        /* lower left of the pixel in sub-pixel units */
        index_x = (index_PIXEL & PIXEL_BIT_COUNT_X) <<
        SUBPIXEL_BIT_COUNT_X;
        index_Y = ((index_PIXEL >>PIXEL_BIT_COUNT_X) & PIXEL_BIT_COUNT_Y)
            << SUBPIXEL_BIT_COUNT_Y;
        if (!Is_MultiSample) {
            /* in aliased mode, the sample position is at the center
of the pixel */
            /* account for Z_REFERENCE at the center of stamp */
            dx = index_X - 8;
            dy = index_Y - 8;
        } else {
            dx = index_X + sampleX[index_SAMPLE] - 16;
            dy = index_Y + sampleY[index_SAMPLE] - 16;
        }
        Z_SAMPLE = Z_REFERENCE + dZdX * dx + dZdY * dy;
}
```

Input Queuing and Filtering

The mode-injection and Phong blocks 847 and 84A place the data packets in the input FIFOs 210. The data from the Phong block 84A is placed in the fragment color queue 230.

For the input packets received from the mode-injection block 847, the input filter 220 looks at the packet header and determines whether the packet is to be passed through to the back-end block 84C, placed in the VSP queue 240, sent to the pixel-out unit 280 or some combination of the three. The pipeline may stall if a packet (bound for the back-end block 84C, VSP queue 240, color queue 230 or the pixel-out input queue) can not be delivered due to insufficient room in the destination queue.

In one embodiment, the VSP queue 240 and the color queue 230 are a series of fixed size records (150 records of 128 bits each for the VSP queue 240 and 128 records of 34 bits each for the color queue 230). The packets received occupy integer number of records. The number of records a packet occupies in a queue depends on its type and, thus, its size.

The pixel block 84B maintains a write pointer and a read pointer for each queue 230, 240 and writes packets bound for a queue into the queue, starting at the record indexed by the write pointer. The pixel block 84B appropriately increments the write pointer, depending on the number of records the packet occupies and accounting for circular queues. If after incrementing a queue write pointer, the pixel block 84B determines that the value held by the write pointer equals that held by the read pointer, it sets the queue's status to "full."

The block 84B retrieves packets from the record indexed by the read pointer and appropriately increments the read pointer, based on the packet type and accounting for circular queues. If after incrementing a queue's read pointer, the pixel block 84B determines the value held by the read pointer equals that held by the write pointer, it sets the input queue's status to "empty."

Subsequent read and write operations on a queue reset the full and empty status bits appropriately.

Input Processing

The pixel block input processor 290 retrieves packets from the VSP and color queues 240 and 230. The input processor 290 stalls if a queue is empty. All packets are processed in the order received. (The VSP queue 240 does not hold only VSP packets but other input packets from the mode-injection block 847 as well—Begin_Tile, Begin_Frame and pixel-mode Stipple packets, for example.)

Before processing a VSP record from the queue 240, the input processor 290 checks to see if it can read the fragment colors (and/or depth/stencil data) corresponding to the VSP record from the color queue 230. If the queue 230 has not yet received the data from the Phong block 847, the input processor 290 stalls until it can read all the color fragments for the VSP record.

Once the required data from the Phong block 84A is received, the input processor 290 starts processing the records in the input queue 240 in order. For each VSP record, it retrieves the color and mode information as needed and passes it on to the pixel pipeline 2M0. If the input processor 290 encounters a pixel-mode or stipple Cache_Fill packet, it uses the cache index supplied with the packet to copy it into the appropriate cache entry.

Scissor Test

The scissor-test unit 2A0 performs the scissor test, the elimination of pixel fragments that fall outside a specified rectangular area. The scissor rectangle is specified in window coordinates with pixel (rather than sub-pixel) resolution. The scissor-test unit 2A0 uses the tile and stamp locations forwarded by the input processor 290 to determine if a fragment is outside the scissor window. The pseudo-code of the logic is given below:

```
boolean Is_valid_Fragment;
boolean Passes_Scissor_Test( )    {
    if (Scissor_Test_Enabled)    {
        X_WINDOW = Tile_X_Location + 2 * Stamp_X_Index
                  + index_PIXEL & 0x1;
        Y_WINDOW = Tile_Y_Location + 2 * Stamp_Y_Index
                  + (index_PIXEL >> 1) & 0x1;
        Is_Valid_Fragment = (X_WINDOW >= X_SCISSOR_MIN) &&
                            (X_WINDOW =< X_SCISSOR_MAX) &&
                            (Y_WINDOW >= Y_SCISSOR_MIN) &&
                            (Y_WINDOW >= Y_SCISSOR_MAX);
        return Is_Valid_Fragment;
    } else {
        return TRUE;
    }
}
``` where $x_{SCISSOR\_MAX}$, $x_{SCISSOR\_MIN}$, $y_{SCISSOR\_MAX}$ and $y_{SCISSOR\_MIN}$ are the maximum and minimum x values and the maximum and minimum y values for valid pixels.

The pixel block 84B discards the fragment if Is_Valid_Fragment is false. Otherwise it passes the fragment on to the next stage of the pipeline. The scissor-test unit 2A0 also sends the ($x_{WINDOW}$, $y_{WINDOW}$) window coordinates to the stipple-test unit 2B0.

This test is done on a per-pixel basis.

Stipple Test

The stipple-test unit 2B0 performs the stipple test if the Stipple_Test_Enabled flag is set (that is to say, is TRUE). Otherwise, the unit 2B0 passes the fragment on to the next stage of the pipeline.

The stipple-test unit 2B0 uses the following logic:

```
boolean Is_Valid_Fragment;
boolean Passes_Stipple_Test( ) {
    if (Stipple_Test_Enabled) {
        /* OpenGL uses 32x32 stipple patterns
           with each bit representing a pixel.*/
        stipple_X_index = (x_WINDOW & 0x1F);
        stipple_Y_index = (Y_WINDOW & 0x1F);
        Is_Valid_Fragment = stipple[stipple_Y_index,
                            stipple_X_index] == 1;
        return Is_Valid_Fragment;
    } else {
        return TRUE;
    }
}
```

The stipple-test unit uses the coordinates (stipple_X_index, stipple_Y_index) to retrieve the stipple bit for the given pixel. If the stipple bit at (stipple_X_index, stipple_Y_index) is not set (that is to say, is FALSE), the stipple test fails, and the pixel block 84B discards the fragment.

The stipple test is a per-fragment operation.

Alpha Test

The alpha-test unit 2C0 keeps or discards an incoming fragment based on its alpha values. The unit 2C0 tests the opacity of the fragment with respect to a reference value, $alpha_{Reference}$, according to a specified alpha test function, $Function_{ALPHA}$. (Table 11 shows the values for $Function_{ALPHA}$ and the associated comparisons according to one embodiment.) If the fragment fails, the alpha-test unit 2C0 discards it. If it passes, the unit 2C0 sends it on to the next stage in the pipeline.

The alpha-test unit 2B0 uses the following logic:

```
boolean Passes_Alpha_Test( ) {
    if (Alpha_Test_Enabled) {
        case (Function_ALPHA) {
            switch NEVER:        return FALSE;
            switch LESS:         return A < alpha_Reference;
            switch EQUAL:        return A == alpha_Reference;
            switch LEQUAL:       return A <= alpha_Reference;
            switch GREATER:      return A > alpha_Reference;
            switch NEQUAL:       return A != alpha_Reference;
            switch GEQUAL:       return A >= alpha_Reference;
            otherwise:           return TRUE;
        }
    } else {
        return TRUE;
    }
}
```

The alpha test is enabled if the Alpha_Test_Enabled flag is set. If the alpha test is disabled, all fragments are passed through. This test applies in RGBA-color mode only. It is bypassed in color-index mode.

Alpha test is a per-fragment operation.

Color Test

Unlike the alpha-test unit and its single reference-value test, the color-test unit 2D0 compares a fragment's RGB value with a range of color values via the keys $color_{MIN}$ and $color_{MAX}$. (The color keys are inclusive of the minimum and maximum values.) If the fragment fails the color test, the unit 2D0 discards it. Otherwise, the unit 1 2D0 passes it down to the next stage in the pipeline.

The color-test unit 2B0 uses the following logic:

```
boolean Passes_Color_Test( ) {
    if (Color_Test_Enabled) {
        switch (Function_COLOR) {
            case NEVER:      return FALSE;
            case LESS:       return C < color_MIN;
            case EQUAL:      return (C >= color_MIN)
                                 & (C <= color_MAX);
            case LEQUAL:     return C <= color_MAX;
            case GREATER:    return C > color_MAX ;
            case NEQUAL:     return (C < color_MIN)
                                 | (C > color_MAX);
            case GEQUAL:     return C >= color_MIN;
            otherwise:       return TRUE;
        }
    } else {
        return TRUE;
    }
}
```

Table 12 shows the values for $Function_{COLOR}$ and the associated comparisons according to one embodiment. $Function_{COLOR}$ is implemented such that the minimum and maximum inclusiveness in the color keys is accounted for appropriately.

The color test is bypassed if the Color_Test_Enabled flag is not set.

The color test is applied in RGBA mode only. In the color-index mode, it is bypassed. The color-test unit 2D0 applies the color test to each of the R, G and B channels separately. The test results for all the channels are logically ANDed. That is to say, the fragment passes the color test passes only if it passes for every one of the channels.

The color test is a per-fragment operation.

Stencil/Z Test

While the alpha and color tests operate only on fragments passing through the pipeline stages, the stencil test uses the stencil buffer 2I0 to operate on a sample or a fragment. The stencil-test unit 2E0 compares the reference stencil value, $stencil_{Reference}$, with what is already in the stencil buffer 2I0 at that location. The unit 2E0 bitwise ANDs both the $stencil_{Reference}$ and the stencil buffer values with the stencil mask, $mask_{STENCIL}$, before invoking the comparison specified by $Function_{STENCIL}$.

In one embodiment, the $Function_{STENCIL}$ state parameter specifies comparisons parallel to those of $Function_{ALPHA}$ and $Function_{COLOR}$.

If the stencil test fails, the sample is discarded and the stored stencil value is modified according to the Stencil_Test_Failed_Operation state parameter.

If the stencil test passes, the sample is subjected to a depth test. If the depth test fails, the stored stencil value is modified according to the Stencil_Test_Passed_Z_Test_Failed_Operation state parameter.

If both the stencil and depth tests pass, the stored stencil value is modified according to the Stencil_and_Z_Tests_Passed_Operation state parameter.

Table 13 shows the values for the Stencil_Test_Failed_Operation, Stencil_Test_Passed_Z_Test_Failed_Operation and Stencil_and_Z_Tests_Passed_Operation state parameters and their associated functions according to one embodiment.

The unit 2E0 masks the stencil bits with the write_$mask_{STENCIL}$ state parameter before writing them into the sample tile buffers. The major difference between pixel and sample stencil operations lies in how the stencil value is retrieved from and written into the tile buffer. The write_$mask_{STENCIL}$ state parameter differs from $mask_{STENCIL}$ in that $mask_{STENCIL}$ affects the stencil values used in the stencil test, whereas write_$mask_{STENCIL}$ affects the bitplanes to be updated.

Considering the overview pseudo-code given above, the following pseudo-code further describes the logic of the stencil-test unit 2E0:

```
boolean Passes_Stencil_Test( ) {
boolean Is_Valid;
    if (No_Stencil_Buffer) {
        return TRUE;
    } else if (Stencil_Test_Enabled) {
        Set_Stencil_Buffer_Pointer(pointer);
        source = (*pointer) & mask_STENCIL;
        reference = Stencil_REFERENCE & mask_STENCIL;
        switch(Function_STENCIL) {
            case NEVER:      Is_Valid = FALSE;
                             break;
            case LESS:       Is_Valid = source < reference;
                             break;
            case EQUAL:      Is_Valid = (source == reference);
                             break;
            case LEQUAL:     Is_Valid = source <= reference;
                             break;
            case GREATER:    Is_Valid = source > reference;
                             break;
            case NEQUAL:     Is_Valid = (source < reference)
                                      | (source > reference);
                             break;
            case GEQUAL:     Is_Valid = source >= reference;
                             break;
            case ALWAYS:
            otherwise:       Is_Valid = TRUE;
        }
        return (Is_Valid);
    } else
        return TRUE;
}
```

-continued

```
doStencil_Test_Failed_Operation ( ) {
    switch (Stencil_Test_Failed_Operation) {
            case ZERO:          value = 0;
                                break;
            case MAX_VALUE:     value = (Stencil_Mode ? 255 : 3);
                                break;
            case REPLACE:       value = stencil_Reference;
                                break;
            case INCR:          value = (*pointer)++;
                                break;
            case DECR:          value = (*pointer)--;
                                break;
            case INCRSAT:       if ((value = (*pointer)++) >
                                   (Stencil_Mode ? 255 : 3)) {
                                    value = (Stencil_Mode ? 255 : 3);
                                }
                                break;
            case DECRSAT:       if ((value = (*pointer)-- ) < 0) {
                                    value = 0;
                                break;
            case INVERT:        value = ~(*pointer);
                                break;
            case KEEP:
            otherwise:
                                value = *pointer;
    }
    if (!No_Saved_Stencil_Buffer) {
        /* write stencil tile */
        *pointer = value & write_mask_STENCIL;
    }
}
doStencil_Test_Passed_Z_Test_Failed_Operation ( ) {
    switch (Stencil_Test_Passed_Z_Test_Failed_Operation) {
    /* same logic as the switch( ){ } in
        Stencil_Test_Passed_Operation( ) */
    }
    if (!No_Save_Stencil_Buffer) {
        /* write stencil tile */
        *pointer = value & write_mask_STENCIL;
    }
}
doStencil_and_Z_Tests_Passed_Operation ( ) {
    switch (Stencil_and_Z_Tests_Passed_Operation) {
    /* same logic as the switch( ){ } in
        Stencil_Test_Passed_Operation( ) */
    }
    if (!No_Save_Stencil_Buffer) {
        /* write stencil tile */
        *pointer = value & write_mask_STENCIL;
    }
}
```

The state parameter Stencil_Mode from a Begin_Frame packet specifies whether the stencil test and save are per-pixel or per-sample operations and, thus, specifies the number of bits involved in the operations (in one embodiment, 2 or 8 bits).

When Stencil_Mode is TRUE, the stencil operations are per pixel, but the depth testing is per sample. For a given pixel, some of the samples may pass the depth test and some may fail the depth test. In such cases, the state parameter StencilFirst from BeginFrame packet determines which of the stencil update operations is carried out. If StencilFirst is TRUE, then depth-test result for the first sample in the pixel determines which of the Stencil_and_Z_Tests_Passed_Operation and Stencil_Test_Passed_Z_Test_Failed_Operation is invoked. Otherwise majority rule is used to decide the update operation. The overview pseudo-code for pixel-block data flow outlines the interaction between the stencil- and the depth-testing operations.

The stencil test is enabled with the Stencil_Test_Enabled flag. The No_Stencil_Buffer flag passed down with the Begin_Frame packet also affects the behavior of the test. Table 16 shows the actions of the stencil-test unit 2E0 based on the settings of Stencil_Test_Enabled, No_Stencil_Buffer and No_Saved_Stencil_Buffer flags. As Table 16 shows, the No_Stencil_Buffer flag overrides other stencil-related rendering state parameters.

The stencil test can be performed on a per-fragment or per-pixel basis.

DrawStencil Functionality

Under certain circumstances, the pixel block 84B may receive a per-pixel stencil value from the Phong block 84A. The pixel block 84B treats this per-pixel stencil value in a manner similar to the stencil reference value, stencil_Reference. If the Stencil_Mode state parameter specifies per-sample operations, the pixel block unit 84B uses the stencil value from the Phong block 84A for all samples of the fragment.

For example, if an application 8211 seeks to copy pixel rectangle into the stencil buffer and per-sample operations are 8-bit operations, the stencil state parameters are set as follows:

| | |
|---|---|
| DrawStencil | TRUE |
| Stencil_Test_Enabled | TRUE |
| Function_STENCIL | ALWAYS |
| mask_STENCIL | 0xff |
| write_mask_STENCIL | 0xff |
| Stencil_Test_Failed_Operation | REPLACE |
| Stencil_Test_Passed_Z_Test_Failed_Operation | REPLACE |
| Stencil_and_Z_Tests_Passed_Operation | REPLACE |
| No_Stencil_Buffer | FALSE |
| No_Saved_Stencil_Buffer | FALSE |

Stencil_Mode TRUE (Per-Pixel Operation)

Depth Test

The depth buffer-test unit 2E0 compares a sample's z value with that stored in the z-buffer 2I0 and discards the sample if the depth comparison fails.

If the depth test passes and Z_Write_Enabled is TRUE, the depth-test unit 2E0 assigns the buffer at the sample's location the sample Z value clamped to the range [0, $2^{Z\_VALUE\_BIT\_COUNT}-1$]. (In one embodiment, Z values are 24-bit values, and thus Z_VALUE_BIT_COUNT is set to 24.) The unit 2E0 updates the stencil buffer value according to the Stencil_and_Z_Tests_Passed_Operation state parameter. The unit 2E0 passes the sample on to the blend unit.

If the depth test fails, the unit 2E0 discards the fragment and updates the stencil value at the sample's location according to the Stencil_Test_Passed_Z_Test_Failed_Operation state parameter.

Considering the overview pseudo-code given above, the following pseudo-code further describes the logic of the depth-test unit 2E0 and the interaction between depth-testing and stencil operations.

```
boolean Passes_Z_Test( ) {
    boolean Is_Valid;
    if (No_Z_Buffer) {
        return TRUE;
    } else if (Z_Test_Enabled) {
        Set_Z_Buffer_Pointer(pointer);
        destination = *pointer;
        switch (Function_DEPTH) {
            case LESS:      Is_Valid = Z < destination;
                            break;
            case GREATER:   Is_Valid = Z > destination;
                            break;
            case EQUAL:     Is_Valid = Z == destination);
                            break;
```

```
         case NEQUAL:      Is_Valid = (Z>destination) |
                           (Z<destination);
                           break;
         case LEQUAL:      Is_Valid = Z <= destination;
                           break;
         case GEQUAL:      Is_Valid = (Z >= destination);
                           break;
         case NEVER:       Is_Valid = FALSE;
                           break;
         case ALWAYS:
         otherwise:        Is_Valid = TRUE;
         }
         return (Is_Valid);
    } else
         return TRUE;
}
```

Five state parameters affect the depth-related operations in the pixel block 84B, namely, Z_Test_Enabled, Z_Write_Enabled, No_Z_Buffer, Function$_{DEPTH}$ and No_Saved_Z_Buffer. An pixel-mode Cache_Fill packet supplies the current values of the Function$_{DEPTH}$, Z_Test_Enabled and Z_Write_Enabled state parameters, while the Begin_Frame packet supplies the current values of the NO_Z_Buffer and No_Saved_Z_Buffer state parameters.

The Z_Test_Enabled flag disables the comparison. With depth testing disabled, the unit 2E0 bypasses the depth comparison and any subsequent updates to the depth-buffer value and passes the fragment on to the next operation. The stencil value, however, is modified as if the depth test passed.

Table 14 further describes the interaction of the four parameters, Z_Test_Enabled, Z_Write_Enabled, No_Z_Buffer and No_Saved_Z_Buffer. As mentioned elsewhere herein, the depth-buffer operations happen only if No_Z_Buffer is FALSE.

The depth test is a per-sample operation. In the aliased mode (Is_MultiSample is FALSE), the depth values are computed at the center of the fragment and assigned to each sample in the fragment. The cull block 846 appropriately generates the sample coverage mask so that, in the aliased mode, all samples are either on or off depending on whether the pixel center is included in the primitive or not.

Z_Visible

The pixel block 84B internally maintains a software-accessible register 2N0, the Z_Visible register 2N0. The block 84B clears this register 2N0 on encountering a Begin_Frame packet. The block 84B sets its value when it encounters the first visible sample of an object and clears it on read.

Blending

Blending combines a sample's R, G, B and A values with the R, G, B and A values stored at the sample's location in the framebuffer 84G. The blended color is computed as:

(Function$_{BLEND}$) (Source_Color_Factor * Color$_{SOURCE}$, Destination_Color_Factor Color$_{DESTINATION}$)

where Function$_{BLEND}$ is a state parameter specifying what operation to apply to the two products, and Source_Color_Factor and Destination_Color_Factor are state parameters affecting the color-blending operation. (The sample is the "source" and the framebuffer the "destination.")

Table 18 gives values in one embodiment for Function$_{BLEND}$(x, y). The function options include addition, subtraction, reverse subtraction, minimum and maximum.

Source_Color_Factor specifies the multiplicand for the sample color-value multiplication, while Destination_Color_Factor specifies the multiplicand for the framebuffer color-value multiplication. Table 17 gives values in one embodiment for the Source_Color_Factor and Destination_Color_Factor state parameters. (The subscript "S" and "D" terms in Table 17 are abbreviations for "SOURCE" and "DESTINATION." The "f" term in Table 17 is an abbreviation for "MINIMUM (A$_{SOURCE}$, 1—A$_{DESTINATION}$).")

The color and alpha results are clamped in the range [0, $2^{COLOR\_VALUE\_BIT\_COUNT}-1$]. In one embodiment, color and alpha values are 8-bit values, and thus COLOR_VALUE_BIT_COUNT is 8.

The Blending_Enabled state parameter enables blending, and blending is enabled only in RGBA-color mode. The Blending_Enabled value comes from a pixel-mode mode packet.

The write_mask$_{RGBA}$ state parameter determines which bitplanes of the red, green, blue and alpha channels are updated.

The No_Color_Buffer and No_Saved_Color_Buffer state parameters also affect the blending operation. Their current values are from a Begin_Frame packet.

Table 15 illustrates the effect of these state parameters on blending in the pipeline.

Alpha values are processed similarly. The Source_Alpha_Factor, Destination_Alpha_Factor and Function$_{ALPHA}$ state parameters control alpha blending. The Function$_{ALPHA}$ is similar to Function$_{COLOR}$, in one embodiment taking the same set of values. Source_Alpha_Factor specifies the multiplicand for the sample alpha-value multiplication, while Destination_Alpha_Factor specifies the multiplicand for the framebuffer alpha-value multiplication. Table 19 lists the possible values in one embodiment for Source_Alpha_Factor and Destination_Alpha_Factor. (The subscript "S" and "D" terms in Table 19 are abbreviations for "SOURCE" and "DESTINATION.")

The sample buffer color and alpha are updated with the new values. The dirty bit for this sample is also set.

The pipeline 840 generates colors and alphas on a per-fragment basis. For blending, the same source color and alpha apply to all covered samples within the fragment.

Either the blend operation or the logical operations can be active at any given time but not both. Also, although OpenGL allows both logical operations and blending to be disabled, the practical effect is the same as if the source values are written into the destination.

Dithering

The pipeline 840 incorporates dithering via three M×M dither matrices, Red_Dither, Green_Dither and Blue_Dither, corresponding to the dithering of each of the red, green and blue components, respectively. The low $\log_2$ M bits of the pixel coordinate (x$_{WINDOW}$, y$_{WINDOW}$) index into each color-component dither matrix. The indexed matrix element is added to the blended color value. The computed red, green and blue values are truncated to the desired number of bits on output.

(Dithering does not alter the alpha values.)

The following pseudo-code outlines the processing:

```
m_int Red_Dither[M, M];
m_int Green_Dither[M, M];
m_int Blue_Dither[M, M];
#define mask (M - 1)
x_DITHER=x_WINDOW & mask;
y_DITHER=y_WINDOW & mask;
red+=Red_Dither[x_DITHER, y_DITHER];
green+=Green_Dither[x_DITHER, y_DITHER];
blue+=Blue_Dither[x_DITHER, y_DITHER];
```

The Dithering_Enabled state parameter enables the dithering of blended colors. Therefore, if blending is disabled, dithering is disabled as well. Since blending is disabled in color-index mode, dithering is also disabled in color-index mode. Table 20 illustrates the effects of the Dithering_Enabled and Blending_Enabled flags.

The specifics of one embodiment are as follow: The rendering pipeline 840 has 8 bits for each color component. The output pixel formats may need to be dithered down to as little as 4 bits per color component. The matrices size M is then 4, and each matrix element is an unsigned 4-bit integer.

In most cases, having one dither matrix applied to all color components may be adequate. However, in some cases, such as converting from RGB888 to RGB565 formats, separate dither matrices for the red, green and blue channels may be desirable. For this reason, the pipeline 840 uses separate dither matrices for red, green and blue components.

Four-bit elements suffice to dither the 8-bit color component values down to 4 bits per color component. If the target pixel format has fewer bits per color channel, dither elements may need more bits.

In one embodiment, the dither matrices are programmable with zero as the default value for all elements. (This disables dithering.) The responsibility then falls on the using software 8211 to appropriately load these matrices.

The described framework will suffice for most applications. Dithering is a per-fragment operation.

Logical Operations

Like the blend unit 2F0, the logical-operations unit 2H0 computes a new color value based on the incoming value and the value stored in the framebuffer 84G. Logical operations for each color component value (red, green, blue and alpha) are independent of each other. Table 21 shows the available logical operations in one embodiment. (The "s" and "d" terms in Table 21 are abbreviations for "SOURCE" and "DESTINATION.")

Logical operations are enabled if blending is disabled, that is to say, if Blending_Enabled is FALSE. Unlike blending, the logical operations may be invoked in color-index as well as RGBA mode, and the dithering does not apply if logical operations are enabled.

Tile Input and Output

The pixel-out unit 280 prepares tiles for output by the back end 84C and for rendering by the pixel block 84B. In preparing tiles for output, the pixel-out unit 280 performs sample-to-pixel resolution on the color, depth and stencil values, as well as pixel-format conversion as needed. In preparing tiles for rendering, the pixel-out unit 280 gets the pixel color, depth and stencil values from the back-end block 84C and does format conversion from the input pixel format (specified by the Pixel_Format state parameter) to the output pixel format (in one embodiment, RGBA8888) before the start of geometry rendering on the tiles.

The pixel-out unit 280 also performs clears.

Figure 5:
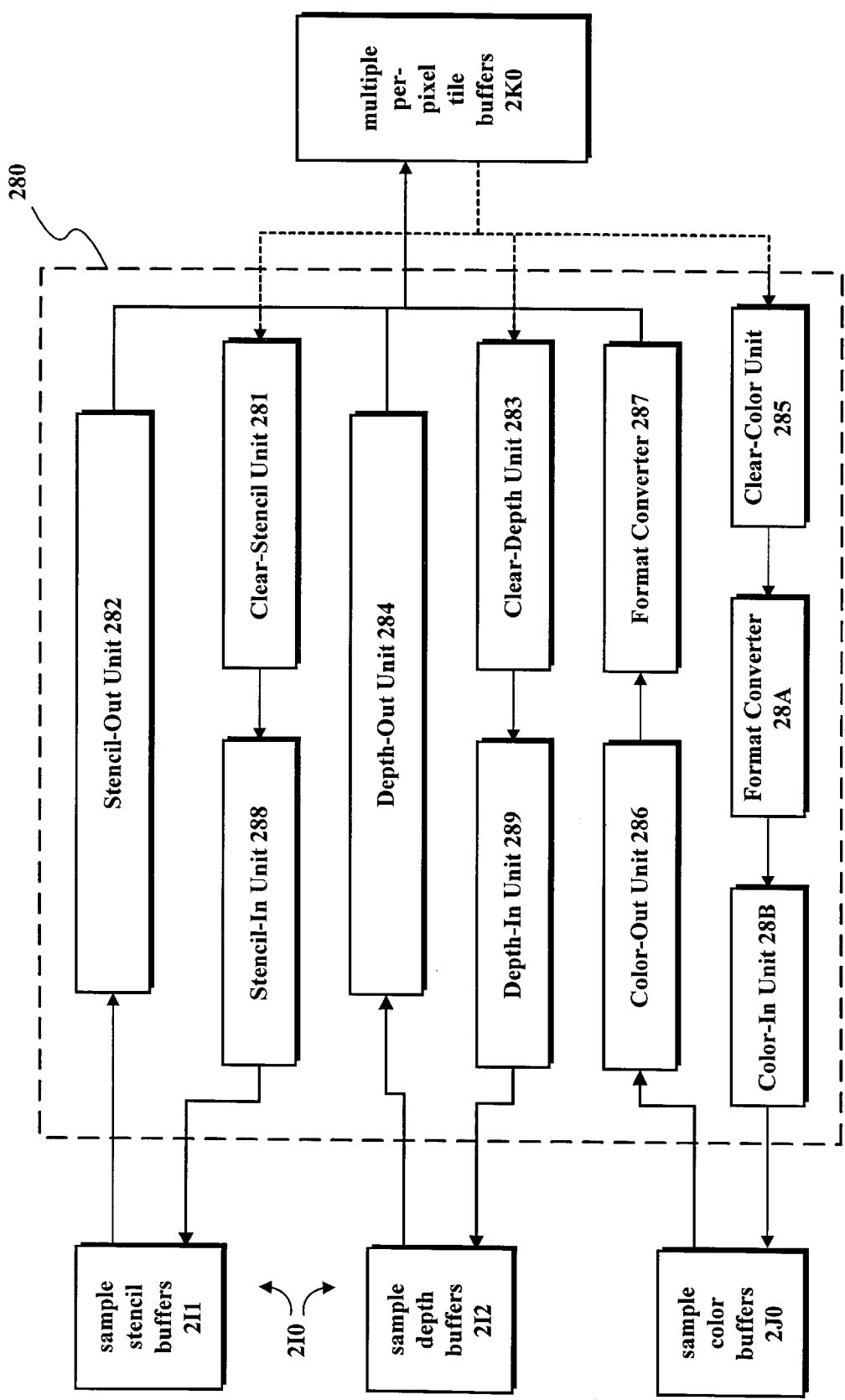
FIG. 5 is a block diagram of the pixel-out unit.
Figure 6:
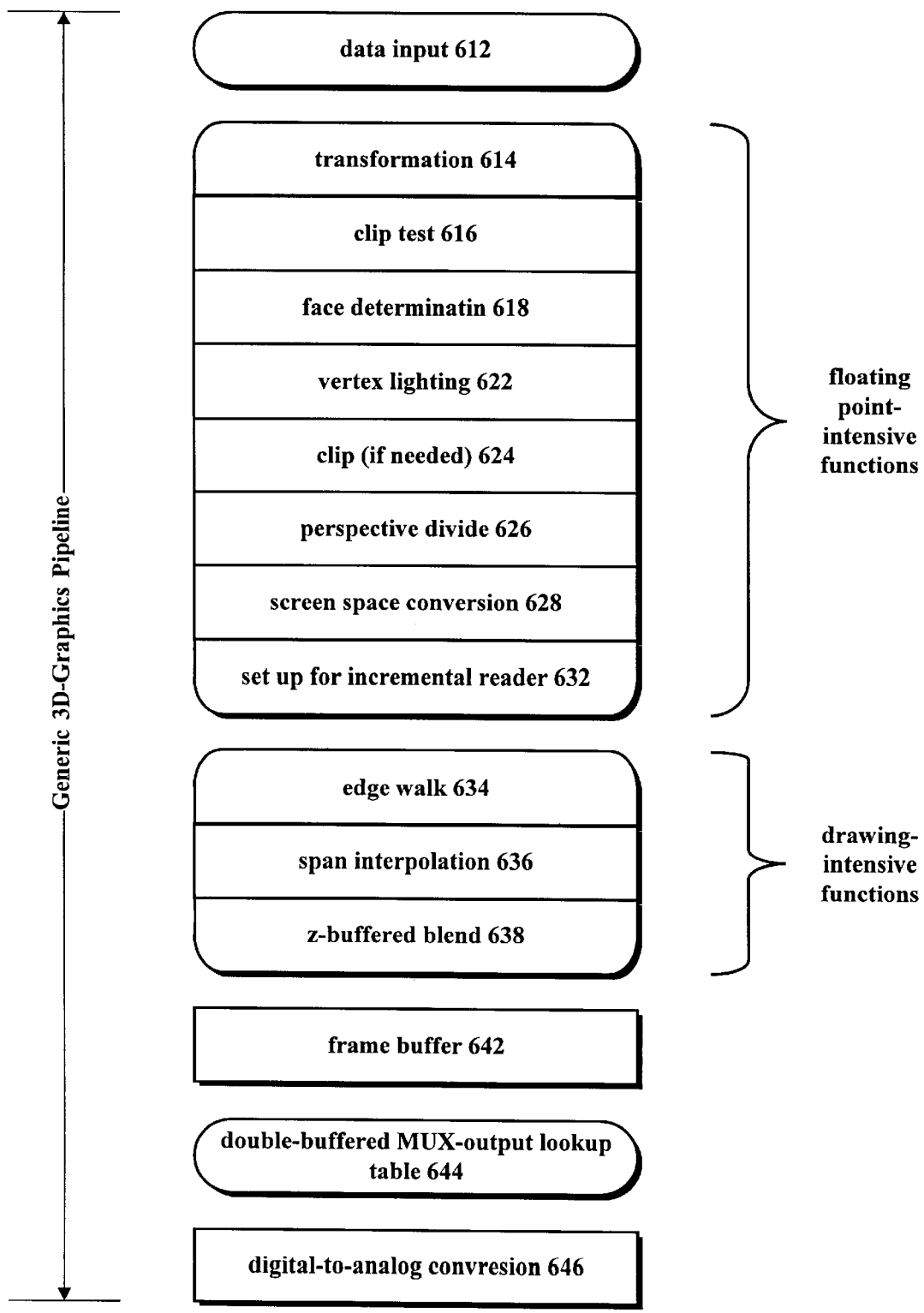
FIG. 6 is a reproduction of the Deering et al. generic 3D-graphics pipeline.

FIG. 5 is a block diagram of the pixel-out unit 280. The pixel-out unit 280 includes stencil-out, depth-out and color-out units 282, 284 and 286 receiving input from the sample stencil, depth and color buffers 2I1,2I2 and 2J0, respectively. The stencil-out and depth-out units 282 and 284 both output to the per-pixel tile buffers 2K0. The color-out unit 286 outputs to a format converter 287 that itself outputs to the buffers 2K0.

The pixel-out unit 280 also includes clear-stencil, clear-depth and clear-color units 281, 283 and 285, all receiving input from the tile buffers 2K0. The clear units implement single-clock flash clear. The communication between clear units and the input units (for example the clear_stencil 281 and stencil-in unit 288) happens via a handshake. The clear-color unit 285 signals the format converter unit 28A that itself outputs to a color-in unit 28B. The stencil-in, depth-in and color-in units 288, 289 and 28B output to the sample stencil, depth and color buffers 2I1, 2I2 and 2J0, respectively.

The stencil-out, depth-out and color-out blocks 282, 284 and 286 convert from sample values to, respectively, pixel stencil, depth and color values as described herein. The stencil-in, depth-in and color-in blocks 288, 289 and 28B convert from pixel to sample values. The format converters 287 and 28A convert between the output pixel format (RGBA8888, in one embodiment) and the input pixel format (specified by the Pixel_Format state parameter, in one embodiment.)

Tile Input

A set of per-pixel tile staging buffers 2K0$a$, 2K0$b$, 2K0$c$, . . . , (generically and individually, 2K0$\alpha$, and, collectively, 2K0) exists between the pixel-out block 280 and the back-end block 84C. Each of these buffers 2K0 has three associated state bits (Empty, BackEnd_Done and Pixel_Done) that regulate (or simulate) the handshake between the pixel-out and back-end blocks 280, 84C for the use of these buffers 2K0. Both the back-end and the pixel-out units 84C, 280 maintain respective current input and output buffer pointers indicating the staging buffer 2K0$\alpha$ from which the respective unit is reading or to which the respective unit is writing.

The pixel block 84B and the pixel-out unit 280 initiate and complete tile output using a handshake protocol. When rendering to a tile is completed, the pixel block 84B signals the pixel-out unit 280 to output the tile. The pixel-out unit 280 sends color, z and stencil values to the pixel buffers 2K0 for transfer by the back end 84C to the framebuffer 84G. The framebuffer 84G stores the color and z values for each pixel, while the pixel block 84B maintains values for each sample. (Stencil values for both framebuffer 84G and the pixel block 84B are stored identically.) The pixel-out unit 280 chooses which values to store in the framebuffer 84G.

In preparing the tiles for rendering by the pixel block 84B, the back-end block 84C takes the next Empty buffer 2K0$\alpha$ (clearing its Empty bit), step 1105, and reads in the data from the framebuffer memory 84G as needed, as determined by its Backend_Clear_Color, Backend_Clear_Depth and Backend_Clear_Stencil state parameters set by a Begin_Tile packet, step 1110. (The back-end block 84C either reads into or clears a set of bitplanes.) After the back-end block 84C finishes reading in the tile, it sets the BackEnd_Done bit, step 1115.

The input filter 220 initiates tile preparation using a sequence of commands to the pixel-out unit 280. This command sequences is typically: Begin_Tile, Begin_Tile, Begin_Tile . . . Each Begin_Tile signals the pixel-out unit 280 to find the next BackEnd_Done pixel buffer. The pixel-out unit 280 looks at the BackEnd_Done bit of the input tile buffer 2K0$\alpha$, step 1205. If the BackEnd_Done bit is not set, step 1210, the pixel-out unit 280 stalls, step 1220. Otherwise, it clears the BackEnd_Done bit, clears the color, depth and/or stencil bitplanes (as needed) in the pixel tile buffer 2K0$\alpha$ and appropriately transfers the pixel tile buffer 2K0$\alpha$ to the tile sample buffers 2I1,2I2 and 2J0, step 1215. When done, the pixel block 240 marks the sample tile buffer as ready for rendering (sets the Pixel_Done bit).

Tile Output

On output, the pixel-out unit 280 resolves the samples in the rendered tile into pixels in the pixel tile buffers 2K0. The pixel-out unit 280 traverses the pixel buffers 2K0 in order and emits a rendered sample tile to the same pixel buffer 2K0α whence it came. After completing the tile output to the pixel tile buffer 2K0α, the pixel-out unit 280 sets the Pixel_Done bit.

On observing a set Pixel_Done bit, step 1125, the back-end block 84C sets its current input pointer to the associated pixel tile buffer 2K0α, clears the Pixel_Done bit (step 1130) and transfers the tile buffer 2K0α to the framebuffer memory 84G. After completing the transfer, the back-end block 84C sets the Empty bit on the buffer 2K0α, step 1135.

Depth Output

The pixel-out unit 280 sends depth values to the pixel buffer 2K0α if the corresponding Begin_Frame packet has cleared the No_Saved_Depth_Buffer state parameter. The Depth_Output_Selection state parameter determines the selection of the sample's z value. The following pseudo-code illustrates the effect of the Depth_Output Selection state parameter:

```
int SAMPLES_PER_PIXEL = 4;
int sorted_sample_depths [SAMPLES_PER_PIXEL];
if (Depth_Output_Selection == FIRST) {
    /* first sample */
    Sample_to_Output = 0;
} else {
    /* sort sample depths into sorted_sample_depths[ ] */
    Order_Sample_Depth_Values( );
    Sample_to_Output = sorted_sample_depths[
        (Depth_Output_Selection == NEAREST)?
            0 : SAMPLES_PER_PIXEL - 1];
}
```

Color Output

The pixel block 84B sends color values to the pixel buffers 2K0 if the corresponding Begin_Frame packet has cleared the No_Saved_Color. Buffer state parameter. The color value output depends on the setting of the Overflow_Frame, Color_Output_Selection and Color_Output_Overflow_Selected state parameters. The following pseudo-code outlines the logic for processing colors on output:

```
int SAMPLES_PER_PIXEL = 4;
color_selected = (Overflow_Frame) ?
        Color_Output_Overflow_Selected :
                            Color_Output_Selection;
switch (color_selected) {
    case WEIGHTED:
        color_PIXEL = Compute_Weighted_Average ( );
        break;
    case FIRST:
        color_PIXEL = first_Sample_Color;
        break;
    case DIRTY:
        fcolor = (0,0,0);
        number_of_samples = 0;
        for (count = 0; count < SAMPLES_PER_PIXEL; count++) {
            if (Sample_Is_Dirty) {
                fcolor += sampleSrcColor;
                number_of_samples++;
            }
        }
        if (number_of_samples > 0)
            color_PIXEL = fcolor/number_of_samples;
        break;
    case MAJORITY:
        numFgnd = numBgnd = 0;
        fcolor = bcolor = (0, 0, 0);
```

-continued

```
        for (count = 0; count < SAMPLES_PER_PIXEL; count++) {
            if (Sample_Is_Dirty) {
                numFgnd++;
                fcolor += sample_Source_Color;
            } else {
                numBgnd++;
                bcolor += sample_Buffer_Color;
            }
        }
        color = (numFgnd >= numBgnd)? fcolor/numFgnd:
                                        bcolor/numBgnd;
    break;
}
```

This computed color is assigned to the pixel.

For some options, like DIRTY_SAMPLES, the color may not be blended between passes. This may cause some aliasing artifacts but prevents the worse artifacts of background colors bleeding through at abutting polygon edges in the case of an overflow of the polygon or sort memory. In any case, the application 8211 has substantial control over combining the color samples prior to output.

The sample weights used in computation of the weighted average are programmable. They are 8-bit quantities in one embodiment. These eight bit quantities are represented as 1.7 numbers (i.e. I integer bit followed by 7 fraction bits in fixed point format). This allows specification of each of the weights to be in the range 0.0 to a little less than 2.0. For uniform weighting of 4 samples in the pixel, the specified weight for each sample should be 32. The weight of the samples will thus add up to 128, which is equal to 1.0 in the fixed point format used in the embodiment.

Stencil Output

The pixel-out unit 280 sends stencil values to the pixel buffer 2K0 if the No_Saved_Stencil_Buffer flag is not set in the corresponding Begin_Frame packet. The stencil values may need to be passed from one frame to the next and used in frame clearing operations. Because of this, keeping sample-level precision for stencils may be necessary. (The application 8211 may choose to use either 8 bits per-pixel or 2 bits per-sample for each stencil value). The Stencil_Mode bit in a Begin_Frame determines if the stencil is per-pixel or per-sample. In either case, the sample-level-precision bits (8, in one embodiment) of stencil information per pixel are sent out.

Pixel-Format Conversion

Pixel format conversion happens both at tile output and at tile preparation for rendering. Left or right shifting the pixel color and alpha components by the appropriate amount converts the pipeline format RGBA8888 to the target format (herein, one of ARGB8888, RGB565 and INDEX8).

TABLE 1

Begin_Frame and Prefetch_Begin_Frame Packets

| Data Item | Bits/Item | Source | Destination |
|---|---|---|---|
| Header | 5 | MIJ | |
| Blocking_Interrupt | 1 | SW | BKE |
| WinSourceL | 8 | SW | BKE |
| WinSourceR | 8 | SW | BKE |
| WinTargetL | 8 | SW | BKE |
| WinTargetR | 8 | SW | BKE |
| Window_X_Offset | 8 | SW | BKE |
| Window_Y_Offset | 12 | SW | BKE |
| Pixel_Format | 2 | SW | PIX, BKE |
| SrcEqTarL | 1 | SW | SRT, BKE |

TABLE 1-continued

Begin_Frame and Prefetch_Begin_Frame Packets

| Data Item | Bits/Item | Source | Destination |
|---|---|---|---|
| SrcEqTarR | 1 | SW | SRT, BKE |
| No_Color_Buffer | 1 | SW | PIX, BKE |
| No_Saved_Color_Buffer | 1 | SW | PIX, BKE |
| No_Z_Buffer | 1 | SW | PIX, BKE |
| No_Saved_Z_Buffer | 1 | SW | PIX, BKE |
| No_Stencil_Buffer | 1 | SW | PIX, BKE |
| No_Saved_Stencil_Buffer | 1 | SW | PIX, BKE |
| Stencil_Mode | 1 | SW | PIX |
| Depth_Output_Selection | 2 | SW | PIX |
| Color_Output_Selection | 2 | SW | PIX |
| Color_Output_Overflow_Selection | 2 | SW | PIX |
| Vertical_Pixel_Count | 11 | SW | BKE |
| StencilFirst | 1 | SW | PIX |
| Total Bits | 87 | | |

TABLE 2

End_Frame and Prefetch_End_Frame Packets

| Data Item | Bits/Item | Source | Destination |
|---|---|---|---|
| Header | 5 | MIJ | |
| Interrupt_Number | 6 | SW | BKE |
| Soft_End_Frame | 1 | SW | MEX |
| Buffer_Over_Occurred | 1 | MEX | SRT, PIX |
| Total Bits | 13 | | |

TABLE 3

VSP Packet

| Data Item | Bits | Description |
|---|---|---|
| Header | 5 | |
| Mode_Cache_Index | 4 | Index of mode information in mode cache. |
| Stipple_Cache_Index | 2 | Index of stipple information in stipple cache. |
| Stamp_X_Index | 3 | X-wise index of stamp in tile. |
| Stamp_Y_Index | 3 | Y-wise index of stamp in tile. |
| Sample_Coverage_Mask | 16 | Mask of visible samples in stamp. |
| $Z_{REFERENCE}$ | 32 | The reference value with respect to which all Z reference values are computed. |
| dZdX | 28 | Partial derivative of z along the x direction. |
| dZdY | 28 | Partial derivative of z along the y direction. |
| Is_MultiSample | 1 | Flag indicating anti-aliased or non-anti-aliased rendering. |
| Total Bits | 122 | |

TABLE 4

Clear Packet

| Data Item | Bits/Item | Source | Destination |
|---|---|---|---|
| Header | 5 | SW | PIX |
| Mode_Cache_Index | 4 | MIJ | PIX |
| Clear_Color | 1 | SW | PIX |
| Clear_Depth | 1 | SW | PIX |
| Clear_Stencil | 1 | SW | PIX |
| Clear_Color_Value | 32 | SW | PIX |
| Clear_Depth_Value | 24 | SW | PIX |
| Clear_Stencil_Value | 8 | SW | PIX |
| Total Bits | 75 | | |

TABLE 5

Tile_Begin and Prefetch_Tile_Begin Packets

| Data Item | Bits/Item |
|---|---|
| Header | 5 |
| First_Tile_In_Frame | 1 |
| Breakpoint_Tile | 1 |
| Tile_Right | 1 |
| Tile_Front | 1 |
| Tile_X_Location | 7 |
| Tile_Y_Location | 7 |
| Tile_Repeat | 1 |
| Tile_Begin_SubFrame | 1 |
| Begin_SuperTile | 1 |
| Overflow_Frame | 1 |
| Write_Tile_ZS | 1 |
| Backend_Clear_Color | 1 |
| Backend_Clear_Depth | 1 |
| Backend_Clear_Stencil | 1 |
| Clear_Color_Value | 32 |
| Clear_Depth_Value | 24 |
| Clear_Stencil_Value | 8 |
| Total Bits | 95 |

TABLE 6

Pixel-Mode Cache Fill Packet (Part 1 of 2)

| Data Item | Bits | Description |
|---|---|---|
| Header | 5 | |
| Mode_Cache_Index | 4 | Index of the cache entry to replace. |
| Scissor_Test_Enabled | 1 | Scissor test enable flag. |
| $x_{Scissor\_Min}$ | 11 | Scissor window definition: $x_{MIN}$ |
| $x_{Scissor\_Max}$ | 11 | Scissor window definition: $x_{MAX}$ |
| $y_{Scissor\_Min}$ | 11 | Scissor window definition: $x_{MIN}$ |
| $y_{Scissor\_Max}$ | 11 | Scissor window definition: $x_{MAX}$ |
| Stipple_Test_Enabled | 1 | Stipple test enable flag. |
| $Function_{ALPHA}$ | 3 | Function for the alpha test. |
| $alpha_{REFERENCE}$ | 8 | Reference value used in alpha test. |
| Alpha_Test_Enabled | 1 | Alpha test enable flag. |
| $Function_{COLOR}$ | 3 | Color-test function. |
| $color_{MIN}$ | 24 | Minimum inclusive value of the color key. |
| $color_{MAX}$ | 24 | Maximum inclusive value for the color key. |
| Color_Test_Enabled | 1 | Color test enable flag. |
| $Stencil_{REFERENCE}$ | 8 | Reference value used in The stencil test. |
| $Function_{STENCIL}$ | 3 | Stencil-test function. |
| $Function_{DEPTH}$ | 3 | Depth-test function. |
| $mask_{STENCIL}$ | 8 | Stencil mask to AND the reference and buffer sample stencil values prior to testing. |
| Stencil_Test_Failure_Operation | 4 | Action to take on failure of the stencil test. |
| Stencil_Test_Pass_Z_Test_Failure_Operation | 4 | Action to take on passage of the stencil test and failure of the depth test. |

TABLE 6-continued

Pixel-Mode Cache Fill Packet (Part 1 of 2)

| Data Item | Bits | Description |
|---|---|---|
| Stencil_and_Z_Tests_Pass_Operation | 4 | Action to take on passage of the both stencil and depth tests. |
| Stencil_Test_Enabled | 1 | Stencil test enable flag. |
| write_mask$_{STENCIL}$ | 8 | Stencil mask for the stencil bits in the buffer that are updated. |

TABLE 7

Pixel-Mode Cache Fill Packet (Part 2 of 2)

| Data Item | Bits | Description |
|---|---|---|
| Z_Test_Enabled | 1 | Depth test enable flag. |
| Z_Write_Enabled | 1 | Depth write enable flag. |
| DrawStencil | 1 | Flag to interpret the second data value from the Phong block 84A as stencil data. |
| write_mask$_{COLOR}$ | 32 | Mask of bit planes in the draw buffer that are enabled. (In color-index mode, the low-order 8 bits are the IndexMask.) |
| Blending_Enabled | 1 | Flag indicating that blending is enabled. |
| Constant_Color$_{BLEND}$ | 32 | Constant color for blending. |
| Source_Color_Factor | 4 | Multiplier for source-derived sample colors. |
| Destination_Color_Factor | 4 | Multiplier for destination-derived sample colors. |
| Source_Alpha_Factor | 3 | Multiplier for sample alpha values. |
| Destination_Alpha_Factor | 3 | Multiplier for sample alpha values already in the tile buffer. |
| Color_LogicBlend_Operation | 4 | Logic or blend operation for color values. |
| Alpha_LogicBlend_Operation | 4 | Logic or blend operation for alpha values. |
| Dithering_Enabled | 1 | Dither test enable flag. |
| TOTAL | 253 | |

TABLE 8

Color Packet

| Data Item | Bits | Description |
|---|---|---|
| Header | 1 | |
| Color | 32 | RGBA data. |
| TOTAL | 33 | |

TABLE 9

Depth Packet

| Data Item | Bits | Description |
|---|---|---|
| Header | 1 | |
| Z | 32 | Fragment stencil or depth data. |
| TOTAL | 33 | |

TABLE 10

Stipple Cache_Fill Packet

| Data Item | Bits | Description |
|---|---|---|
| Header | 1 | |
| Stipple_Cache_Index | 2 | Index of cache entry to replace. |
| Stipple_Pattern | 1024 | Stipple pattern. |
| TOTAL | 1031 | |

TABLE 11

Alpha-Test Functions

| Function$_{ALPHA}$ | Value | Comparison |
|---|---|---|
| LESS | 0x1 | (A < alpha$_{Reference}$) |
| LEQUAL | 0x3 | (A <= alpha$_{Reference}$) |
| EQUAL | 0x2 | (A == alpha$_{Reference}$) |
| NEQUAL | 0x5 | (A != alpha$_{Reference}$) |
| GEQUAL | 0x6 | (A >= alpha$_{Reference}$) |
| GREATER | 0x4 | (A > alpha$_{Reference}$) |
| ALWAYS | 0x7 | (TRUE) |
| NEVER | 0x0 | (FALSE) |

TABLE 12

Color-Test Functions

| Function$_{COLOR}$ | Value | Comparison |
|---|---|---|
| LESS | 0x1 | (C < color$_{MIN}$) |
| LEQUAL | 0x3 | (C =< color$_{MAX}$) |
| EQUAL | 0x2 | (C >= color$_{MIN}$) & (C =< color$_{MAX}$) |
| NEQUAL | 0x5 | (C < color$_{MIN}$) \| (C > color$_{MAX}$) |
| GEQUAL | 0x6 | (C >= color$_{MIN}$) |
| GREATER | 0x4 | (C > color$_{MAX}$) |
| ALWAYS | 0x7 | TRUE |
| NEVER | 0x0 | FALSE |

TABLE 13

Stencil Operations

| Operation | Value | Action |
|---|---|---|
| KEEP | 0x0 | Keep stored value |
| ZERO | 0x1 | Set value to zero |
| MAX_VAL | 0x2 | Set to the maximum allowed. For pipeline 840 maximum stencil value is 255 in the per-pixel mode and 3 in the per-sample mode. |
| REPLACE | 0x3 | Replace stored value with reference value |
| INCR | 0x4 | Increment stored value |
| DECR | 0x5 | Decrement stored value |
| INCRSAT | 0x6 | Increment stored value, Clamp to max on overflow. This is equivalent to the INCR operation in OpenGL. |
| DECRSAT | 0x7 | Decrement stored value; Clamp to 0 on underflow. This is equivalent to the DECR operation in OpenGL. |
| INVERT | 0x8 | Bitwise invert stored value |

TABLE 14

Depth-Test Flag Effects

| No_Z_Buffer | No_Saved_Z_Buffer | Z_Test_Enabled | Z_Test_Write_Enabled | Action |
|---|---|---|---|---|
| TRUE | TRUE | X | X | The depth-test, -update and -output operations are all bypassed regardless of the value of other parameters. (Such a situation might arise when a pre-sorted scene is being rendered.) Stencil values are updated as if the depth test passed. No_Saved_Z_Bufferfer is TRUE if No_Z_Buffer is TRUE. |
| FALSE | X | FALSE | FALSE | It is as if the depth test always passes but the z-buffer values on chip are not updated for the current object (a decal or a sorted transparency, for example). Depth tile buffer is output to the framebuffer memory only if No_Saved_Z_Buffer is FALSE. |
| FALSE | X | FALSE | TRUE | It is as if the depth test always passes. Tile depth buffer values are updated. The depth buffer is written out to framebuffer memory on output only if No_Saved_Z_Buffer is FALSE. |
| FALSE | X | TRUE | FALSE | Depth test is conducted but the tile depth buffer is not updated for this object. (Again, examples are multi-pass rendering and transparency.) Depth buffer is sent to the framebuffer memory on output only if No_Saved_Z_Buffer is FALSE. |
| FALSE | X | TRUE | TRUE | Everything is enabled. Depth buffer is sent to the framebuffer memory on output only if No_Saved_Z_Buffer is FALSE. |

TABLE 15

Blend Flag Effects

| No_Color_Buffer | Blending_Enabled | No_Saved_Color_Buffer | Action |
|---|---|---|---|
| TRUE | X | TRUE | Color operations such as blending, dithering and logical operations are disabled. Color buffer is also not sent to framebuffer memory on output. (Such a situation may arise during creation of a depth map.) No_Saved_Color_Buffer is TRUE if No_Color_Buffer is TRUE. |
| FALSE | FALSE | X | Blending is disabled. Logic op setting may determine how the color is combined with the tile buffer value. Tile color buffer is sent to framebuffer memory on output only if No_Saved_Color_Buffer is FALSE. |
| FALSE | TRUE | X | Blending is enabled. Tile color buffer is sent to framebuffer memory on output only if No_Saved_Color_Buffer is FALSE. |

TABLE 16

Stencil Test Flag Effects

| No_Stencil_Buffer | Stencil_Test_Enabled | No_Saved_Stencil_Buffer | Action |
|---|---|---|---|
| TRUE | X | X | The stencil-test, -update and -output operations are all bypassed regardless of the value of Stencil_Test_Enabled and No_Saved_Stencil_Buffer. If DrawStencil is TRUE, the stencil value received from the Phong block 84A is also ignored. (No_Saved_Stencil_Buffer is TRUE if No_Stencil_Buffer is TRUE. |
| FALSE | FALSE | FALSE | It is as if the stencil test always passes and all stencil operations are KEEP, effectively a NoOp. The stencil tile buffer is output to the framebuffer memory. If DrawStencil is TRUE, the stencil value received from the Phong block 84A is also ignored. |
| FALSE | FALSE | TRUE | It is as if the stencil test always passes and all stencil operations are KEEP, effectively a NoOp. The stencil tile buffer is not output either. If Draw Stencil is TRUE, the stencil value received from the Phong block 84A is also ignored. |
| FALSE | TRUE | FALSE | The stencil test is performed and the stencil tile is written out. If DrawStencil is TRUE, the stencil value received from the Phong block 84A is used instead of $stencil_{REFERENCE}$ in tests and updates. |
| FALSE | TRUE | TRUE | The Stencil test is performed, but the stencil buffer is not written out. If DrawStencil is TRUE, the stencil value received from the Phong block 84A is used instead of $stencil_{REFERENCE}$ in tests and updates. |

TABLE 17

Color Blend Factors

| Value | Encoding | Blend Factors |
|---|---|---|
| ZERO | 0x8 | (0,0,0) |
| ONE | 0x0 | (1,1,1) |
| SOURCE_COLOR | 0x1 | $(R_S, G_S, B_S)$ |
| ONE_MINUS_SOURCE_COLOR | 0x9 | $(1, 1, 1) - (R_S, G_S, B_S)$ |
| DESTINATION_COLOR | 0x3 | $(R_D, G_D, B_D)$ |
| ONE_MINUS_DESTINATION_COLOR | 0xB | $(1, 1, 1) - (R_D, G_D, B_D)$ |
| SOURCE_ALPHA | 0x4 | $(A_S, A_S, A_S)$ |
| ONE_MINUS_SOURCE_ALPHA | 0xC | $(1, 1, 1) - (A_S, A_S, A_S)$ |
| DESTINATION_ALPHA | 0x6 | $(A_D, A_D, A_D)$ |
| ONE_MINUS_DESTINATION_ALPHA | 0xE | $(1, 1, 1) - (A_D, A_D, A_D)$ |
| SOURCE_ALPHA_SATURATE | 0xF | (f, f, f) |
| CONSTANT_COLOR | 0x2 | $(R_C, G_C, B_C)$ |
| ONE_MINUS_CONSTANT_COLOR | 0xA | $(1, 1, 1) - (R_C, G_C, B_C)$ |
| CONSTANT_ALPHA | 0x5 | $(A_C, A_C, A_C)$ |
| ONE_MINUS_CONSTANT_ALPHA | 0xD | $(1, 1, 1) - (A_C, A_C, A_C)$ |

TABLE 18

Function$_{BLEND}$ Values

| Value | Encoding | Operation |
|---|---|---|
| ADD (x, y) | 0x0 | x + y |
| SUBTRACT (x, y) | 0x1 | x − y |
| REVERSE_SUBTRACT (x, y) | 0x2 | y − x |
| MINIMUM (x, y) | 0x3 | minimum(x, y) |
| MAXIMUM (x, y) | 0x4 | maximum(x, y) |

TABLE 19

Source and Destination Alpha Blend Factors

| Value | Encoding | Blend Factors |
|---|---|---|
| ZERO | 0x4 | (0,0,0,0) |
| ONE | 0x0 | (1,1,1,1) |
| SOURCE_ALPHA | 0x1 | $A_s$ |
| ONE_MINUS_SOURCE_ALPHA | 0x5 | $(1 - A_s)$ |
| DESTINATION_ALPHA | 0x3 | $A_d$ |
| ONE_MINUS_DESTINATION_ALPHA | 0x7 | $(1 - A_d)$ |
| CONSTANT_ALPHA | 0x2 | $A_c$ |
| ONE_MINUS_CONSTANT_ALPHA | 0x6 | $(1 - A_c)$ |

TABLE 20

Effects of Blending_Enabled and Dithering_Enabled State Parameters

| Blending_Enabled | Dithering_Enabled | Operation |
|---|---|---|
| TRUE | TRUE | Blending and dithering are enabled. Logical operations are disabled. |
| TRUE | FALSE | Blending is enabled. Dithering and logical operations are disabled. |
| FALSE | TRUE | Blending and dithering are disabled. Logical operations are enabled. |
| FALSE | FALSE | Blending and dithering are disabled. Logical operations are enabled. |

TABLE 21

Logical Operations

| Value | Encoding | Operation |
|---|---|---|
| CLEAR | 0x0 | 0 |
| COPY | 0x3 | s |
| NOOP | 0x5 | d |
| SET | 0xf | all 1's |
| AND | 0x1 | s ∧ d |
| AND_REVERSE | 0x2 | s ∧ ¬d |
| AND_INVERTED | 0x4 | ¬s ∧ d |
| XOR | 0x6 | s xor d |
| OR | 0x7 | s ∨ d |
| NOR | 0x8 | ¬(s ∨ d) |
| EQUIVAENT | 0x9 | ¬(s xor d) |
| INVERT | 0xa | ¬d |
| OR_REVERSE | 0xb | s ∨ ¬d |
| COPY_INVERTED | 0xc | ¬s |
| OR_INVERTED | 0xd | ¬s ∨ d |
| NAND | 0xe | ¬(s ∧ d) |

TABLE 22

State Parameters (Part 1 of 2)
Parameter

Stipple_Pattern
Pixel_Format
No_Saved_Stencil_Buffer
No_Stencil_Buffer
No_Z_Buffer
No_Saved_Z_Buffer
No_Color_Buffer
No_Saved_Color_Buffer
Color_Output_Selection
Color_Output_Overflow_Selection
DrawStencil
SampleLocations
SampleWeights
Depth_Output_Selection
Stencil_Mode
Tile_X_Location
Tile_Y_Location
Clear_Color_Value
Clear_Depth_Value
Clear_Stencil_Value
DepthClearMask
write_mask$_{STENCIL}$
Overflow_Frame
Enable_Flags TABLE 22-continued State Parameters (Part 1 of 2)
Parameter Is_MultiSample
write_mask$_{RGBA}$
Function$_{ALPHA}$
alpha$_{Reference}$

TABLE 23

State Parameters (Part 2 of 2)
Parameter

Function$_{COLOR}$
Constant_Color$_{BLEND}$
color$_{MIN}$
color$_{MAX}$
Function$_{DEPTH}$
Function$_{STENCIL}$
Stencil_Test_Failed_Operation
Stencil_Test_Passed_Z_Test_Failed_Operation
Stencil_and_Z_Tests_Passed_Operation
Source_Color_Factor
Destination_Color_Factor
Color_LogicBlend_Operation
Source_Alpha_Factor
Destination_Alpha_Factor
stencil$_{REFERENCE}$
mask$_{STENCIL}$
x$_{Scissor\_Min}$
x$_{Scissor\_Max}$
y$_{Scissor\_Min}$
y$_{Scissor\_Max}$

What is claimed is:

1. A method for rendering a graphics image, said method comprising:
receiving first data associated with a fragment having pixel-level resolution;
performing a first fragment operation on said fragment on a per-pixel basis using said first data;
receiving second data associated with said fragment having sample-level resolution wherein said sample-level resolution is different than said pixel-level resolution; and
performing a second fragment operation on said fragment on a per-sample basis using said second data.

2. The method of claim 1, wherein said step of performing on a per-pixel basis comprises:
performing one of the following fragment operations on a per-pixel basis: scissor test, stipple test, alpha test, color test; wherein said step of performing on a per-sample basis comprises:
performing one of the following fragment operations on a per-sample basis: Z test blending, dithering.

3. The method of claim 1, wherein said step of performing on a per-sample basis comprises:
programmatically selecting a set of subdivisions of a pixel as samples for use in said fragment operation on a per-sample basis, and
wherein said method further comprises;
then programmatically selecting a different set of subdivisions of a pixel as samples for use in a second fragment operation on a per-sample basis; and
then performing said second fragment operation on a fragment on a per-sample basis, using said programmatically selected samples.

4. The method of claim 1, wherein said step of performing on a per-sample basis comprises:
programmatically selecting a set of subdivisions of a pixel as samples for use in said fragment operation on a per-sample basis;
programmatically assigning different weights to two samples in said set; and
performing said fragment operation on said fragment on a per-sample basis, using said programmatically selected and differently weighted samples.

5. The method of claim 1, the method further comprising:
dividing the area of an image being rendered into a plurality of tiles, each tile comprising a multiplicity of pixels in the Image;
storing, for a selected one of the tiles, a plurality of per-sample color values for each pixel;
rendering, for the selected tile, graphics data, generating per-sample color value;
converting, when the rendering for the selected tile is completed, for each pixel in the selected tile, the per-sample color values to per-pixel color values by blending the plurality of per-sample color values; and
storing the per-pixel color values in a frame buffer.

6. The method of claim 5, the method further comprising:
spatially sorting said graphics data into said plurality of tiles, generating a list for each of said tiles of said graphics data that overlap said tiles;
selecting a current tile from said plurality of tiles; and
determining visible said fragments of said geometry data in said current tile.

7. A method for rendering a graphics image, said method comprising:
performing one of the following fragment operations on a fragment on a per-pixel basis: scissor test, stipple test, alpha test, color test;
programmatically selecting, based on a state parameter, whether to perform a stencil test on a per-pixel or a per-sample basis, and
performing said stencil test on said selected basis; and
programmatically selecting a set of subdivisions of a pixel as samples for use in a fragment operation on a per-sample basis;
programmatically assigning different weights to two samples in said set; and
performing one of the following fragment operations on a per-sample basis, using said programmatically selected and differently weighted samples: Z test, blending, dithering;
then programmatically selecting a different set of subdivisions of a pixel as samples for use in a second fragment operation on a per-sample basis; and
then performing said second fragment operation on a fragment on a per-sample basis, using said programmatically selected samples.

8. A computer-readable medium for data storage wherein is located a computer program for causing a graphics-rendering system to render an image by:
performing one of the following fragment operations on a fragment on a per-pixel basis: scissor test, stipple test, alpha test, color test;
programmatically selecting, based on a state parameter, whether to perform a stencil test on a per-pixel or a per-sample basis, and performing said stencil test on said selected basis; and programmatically selecting a set of subdivisions of a pixel as samples for use in a fragment operation on a per-sample basis, performing one of the following fragment operations on a per-sample basis, using said programmatically selected samples: Z test, blending, dithering;

then programmatically selecting a different set of subdivisions of a pixel as samples for use in a second fragment operation on a per-sample basis; and then performing said second fragment operation on a fragment on a per-sample basis, using said programmatically selected samples.

9. A system for rendering graphics images, said system comprising:

a port for receiving commands from a graphics application;

an output for sending a rendered image to a display; and a fragment-operations pipeline, coupled to said port and to said output, said fragment-operations pipeline comprising:

a stage for performing a fragment operation on a fragment on a per-pixel basis based on data having per-pixel resolution; and a stage for performing a fragment operation on said fragment on a per-sample basis based on data having per-sample resolution wherein said per-sample resolution is different than said per-pixel resolution.

10. The system of claim 9, wherein said stage for performing on a per-pixel basis comprises one of the following: a scissor-test stage, a stipple-test stage, an alpha-test stage, a color-test stage.

11. The system of claim 9, wherein said stage for performing on a per-sample basis comprises one of the following: a Z-test stage, a blending stage, a dithering stage.

12. A graphics rendering method for forming a rendered image in a frame buffer, the graphics rendering method comprising the steps:

receiving graphics data comprising graphics primitives;

spatially sorting the received graphics primitives into a plurality of tiles, each tile comprising a muliplicity of pixel locations within the image;

selecting a current tile from the plurality of tiles;

generating primitive fragments of the graphics primitives in the current tile;

reading previously stored per-pixel color data from the frame buffer;

converting the read per-pixel color data into per-sample color data;

storing the per-sample color data in a sample buffer, wherein said sample buffer is separate from said frame buffer;

performing per-sample fragment operations on the primitive fragments and the stored per-sample color data, generating updated per-sample color data, the updated per-sample color data being stored in the sample buffer;

converting the per-sample color data in the sample buffer into updated per-pixel color data; and storing the updated per-pixel color data into the frame buffer.

13. The graphics rendering method of claim 12, further comprising the steps:

determining visible primitive fragments from the generated primitive fragments, using only the visible primitive fragments as the primitive fragments in the step performing per-sample fragment operations, thereby avoiding performing per-sample fragment operations on generated primitive fragments that are not visible primitive fragments.

14. The graphics rendering method of claim 13, further comprising the steps:

generating color values for the visible primitive fragments, thereby avoiding generating color values for any of the generated primitive fragments that are not visible primitive fragments.

15. The graphics rendering method of claim 13, further comprising the step:

performing per-pixel fragment operations on the primitive fragments to generate resultant fragments, the resultant fragments used as the primitive fragments in the step of performing per-sample fragment operations.

16. The graphics rendering method of claim 15, further comprising the steps:

programmatically selecting whether to perform a stencil test on a per-pixel or on a per-sample basis;

if the per-pixel basis for stencil test is selected, performing a per-pixel stencil method, the per-pixel stencil method comprising the steps:

(a) reading previously stored per-pixel stencil data from the frame buffer;

(b) storing the per-pixel stencil data in the sample buffer;

(c) performing the stencil test on the primitive fragments and the stored per-pixel stencil data, generating updated per-pixel stencil data, the updated per-pixel stencil data being stored in the sample buffer; and (d) storing the updated per-pixel stencil data into the frame buffer; and if the per-sample basis for stencil test is selected, performing a per-sample stencil method, the per-sample stencil method comprising the steps:

(a) reading previously stored per-sample stencil data from the frame buffer;

(b) storing the per-sample stencil data in the sample buffer;

(c) performing the stencil test on each sample in the primitive fragments and the stored per-sample stencil data, generating updated per-sample stencil data, the updated per-sample stencil data being stored in the sample buffer; and (d) storing the updated per-sample stencil data into the frame buffer.

17. The graphics rendering method of claim 16, further comprising the steps:

detecting a condition of an application program specifying a buffer clear operation such that the previously stored stencil data from the frame buffer has substantially no effect on the stencil data stored into the frame buffer; and skipping the step of reading previously stored per-pixel color data from the frame buffer when the detected condition exists.

18. The graphics rendering method of claim 12, further comprising the steps:

reading previously stored per-pixel depth data from the frame buffer;

converting the read per-pixel depth data Into per-sample depth data;

storing the per-sample depth data in the sample buffer;

performing per-sample fragment operations on the primitive fragments and the stored per-sample depth data, generating updated per-sample depth data, the updated per-sample depth data being stored in the sample buffer;

programmatically selecting a choosing criteria to choose amongst per-sample depth data so as to generate a per-pixel depth data;

choosing the per-sample depth data in the sample buffer according to the programmatically selected choosing criteria as updated per-pixel depth data; and storing the updated per-pixel depth data into the frame buffer.

19. The graphics rendering method of claim 18, further comprising the steps:

detecting a condition of an application program specifying a buffer clear operation such that the previously stored per-pixel depth data from the frame buffer has substantially no effect on the per-pixel depth data stored in the step of storing the updated per-pixel depth data into the frame buffer; and skipping the step of reading previously stored per-pixel depth data from the frame buffer when the detected condition exists.

20. The graphics rendering method as in claim 19, further comprising the step:

after the step of reading previously stored per-pixel color data from the frame buffer and before converting the read per-pixel color data into per-sample color data, storing the read per-pixel color data into one of a plurality of pixel tile buffers, the plurality of pixel tile buffers storing per-pixel data corresponding to a plurality of tiles; and wherein the step of storing the per-sample color data in a sample buffer further comprises the step of selecting one of a plurality of sample buffers for storing per-sample color data; the step of converting the per-sample color data in the sample buffer into updated per-pixel color data further comprises the step weighting each of the samples in a pixel by a programmatically selected weight.

21. The graphics rendering method of claim 20, further comprising the steps:

selecting one of the plurality of pixel tile buffers for storing the read per-pixel color data corresponding to the current file; and setting handshaking bits indicating when the selected pixel tile buffer is empty and when reading previously stored per-pixel color data from the frame buffer is completed.

22. The graphics rendering method as in claim 12 further comprising the steps:

caching a plurality of pipeline state information settings; and selecting one of the pipeline state information settings as parameters for use In the per-sample fragment operations.

23. A graphics rendering method for forming a rendered image in a frame buffer, the graphics rendering method comprising the steps:

receiving graphics data comprising graphics primitives;

spatially sorting the received graphics primitives into a plurality of tiles, each tile comprising a multiplicity of pixel locations within the image;

selecting a current tile from the plurality of tiles;

generating primitive fragments of the graphics primitives in the current tile;

performing per-sample fragment operations on the primitive, generating per-sample color data;

storing the generated per-sample color data in one of a plurality of sample buffers;

converting the stored per-sample color data into per-pixel color data;

storing the per-pixel color data, and not the per-sample color data, into one of a plurality of pixel tile buffers; and.

transferring the per-pixel color data from the one of a plurality of pixel tile buffer to the frame buffer.

24. The graphics rendering method of claim 23, further comprising the steps:

determining visible primitive fragments from the generated primitive fragments, using only the visible primitive fragments as the primitive fragments in the step performing per-sample fragment operations, thereby avoiding performing per-sample fragment operations on generated primitive fragments that are not visible polygon fragments; and generating color values for the visible primitive fragments, thereby avoiding generating color values for any of the generated primitive fragments that are not visible primitive fragments.

25. A graphics pipeline forming a rendered image in a frame buffer, the graphics pipeline comprising:

logic receiving graphics data comprising graphics primitives;

logic spatially sorting the received graphics primitives into a plurality of tiles, each tile comprising a multiplicity of pixel locations within the image;

a first memory storing the sorted graphics primitives;

logic selecting a current tile from the plurality of tiles;

logic generating primitive fragments of the graphics primitives in the current tile;

read logic reading previously stored per-pixel color data for the current tile from the frame buffer;

a second memory storing the per-pixel color for the current tile;

logic converting the per-pixel color data in the second memory into per-sample color data;

a third memory storing the per-sample color data;

fragment logic comprising logic performing per-sample fragment operations on the primitive fragments and the stored per-sample color data, generating updated per-sample color data, the updated per-sample color data being stored in the third memory;

logic converting the per-sample color data in the third memory into updated per-pixel color data; and logic storing the updated per-pixel color data into the frame buffer.

26. The graphics pipeline of claim 25, further comprising:

logic determining visible primitive fragments from the generated primitive fragments;

the fragment logic further comprising logic performing per-sample fragment operations on only the visible primitive fragments, thereby avoiding performing per-sample fragment operations on generated primitive fragments that are not visible primitive fragments;

logic generating color values for the visible primitive fragments, thereby avoiding generating color values for any of the generated primitive fragments that are not visible primitive fragments;

logic detecting a condition of an application program specifying a buffer clear operation such that the previously stored per-pixel color data from the frame buffer has substantially no effect on the updated per-pixel color data;

the read logic skipping the reading of previously stored per-pixel color data from the frame buffer when the detected condition exists; and logic performing per-pixel fragment operations on the primitive fragments to generate resultant fragments, the resultant fragments used as the primitive fragments by the fragment logic;

the read logic reading previously stored per-pixel depth data from the frame buffer;

logic converting the read per-pixel depth data into per-sample depth data;

the third memory storing the per-sample depth data;

the fragment logic further comprising logic performing per-sample fragment operations on the primitive fragments and the stored per-sample depth data, generating updated per-sample depth data, the updated per-sample depth data being stored in the third memory;

a register storing a programmatically set value selecting a criteria to choose amongst per-sample depth data;

logic choosing the updated per-sample depth data according to the programmatically set value so as to generate updated per-pixel depth data; and logic storing the updated per-pixel depth data into the frame buffer.

27. The graphics pipeline of claim 26, further comprising:

a register storing a programmatically set value selecting whether to perform a stencil test on a per-pixel basis or on a per-sample basis;

the read logic reading previously stored stencil data from the frame buffer;

logic storing the read stencil data into the second memory;

the fragment logic further comprising logic performing the stencil test and generating updated stencil date, the stencil test being performed on: (1) a per-pixel basis if the set value indicates the per-pixel basis, or (2) a per-sample basis if the set value indicates the per-sample basis;

logic storing the updated stencil data into the frame buffer;

logic detecting a condition of an application program specifying a buffer clear operation such that the previously stored stencil data from the frame buffer has substantially no effect on the updated stencil data; and the read logic skipping the reading of previously stored stencil data from the frame buffer when the detected condition exists.

28. A graphics pipeline forming a rendered image in a frame buffer, the graphics pipeline comprising:

logic receiving graphics data comprising graphics primitives;

logic spatially sorting the received graphics primitives into a plurality of tiles, each tile comprising a multiplicity of pixel locations within the image;

a first memory storing the sorted graphics primitives;

logic selecting a current tile from the plurality of tiles;

logic generating primitive fragments of the graphics primitives in the current tile;

a plurality of second memories storing per-sample color data;

fragment logic performing per-sample fragment operations on the primitive fragments and generating per-sample color data, storing the per-sample color data in a selected one of the second memories;

a plurality of third memories storing per-pixel color values, and not per-sample color values;

logic converting the per-sample color data in the selected second memory into per-pixel color data, storing the per-pixel color data, and not per-sample color data, into a selected one of the third memories; and logic storing the per-pixel color data into the frame buffer.

29. The graphics pipeline of claim 28, further comprising:

logic determining visible primitive fragments from the generated primitive fragments;

the fragment logic further comprising logic performing per-sample fragment operations on only the visible primitive fragments, thereby avoiding performing per-sample fragment operations on generated primitive fragments that are not visible primitive fragments.

30. The graphics pipeline of claim 29, further comprising:

logic generating color values for the visible primitive fragments, thereby avoiding generating color values for any of the generated primitive fragments that are not visible primitive fragments.

31. A method for rendering a graphics image, said method comprising:

programmatically selecting whether to perform a stencil test on a per-pixel or a per-sample basis, and performing said stencil test on said selected basis.

32. A computer-readable medium for data storage wherein is located a computer program for causing a graphics-rendering system to render an image by:

receiving first data associated with a fragment having pixel-level resolution;

performing a first fragment operation on said fragment on a per-pixel basis using said first data;

receiving second data associated with said fragment having sample-level resolution wherein said per-sample resolution is different than said per-pixel resolution; and performing a second fragment operation on said fragment on a per-sample basis using said second data.

* * * * *